United States Patent
Alexander et al.

(10) Patent No.: US 8,136,142 B2
(45) Date of Patent: Mar. 13, 2012

(54) CENTRALIZED CONTENT MANAGEMENT SYSTEM FOR MANAGING DISTRIBUTION OF PACKAGES TO VIDEO SERVICE PROVIDERS

(75) Inventors: James H. Alexander, Highlands Ranch, CO (US); Michael Petrusis, Santa Monica, CA (US); Yoichi Yamamoto, Los Angeles, CA (US); Sumanth Gentela, Norcross, GA (US); Ashish Ghanate, Norcross, GA (US)

(73) Assignee: Ericsson Television, Inc., Duluth, GA (US)

( * ) Notice: Subject to any disclaimer, the term of this patent is extended or adjusted under 35 U.S.C. 154(b) by 392 days.

(21) Appl. No.: 12/496,738

(22) Filed: Jul. 2, 2009

(65) Prior Publication Data
US 2011/0004897 A1      Jan. 6, 2011

(51) Int. Cl.
*H04N 7/173*      (2011.01)
(52) U.S. Cl. ......... 725/115; 725/105; 725/114; 725/118
(58) Field of Classification Search .................... 725/86, 725/91, 93, 92, 105, 114, 115, 116, 117, 725/118, 119; 375/240.01; 348/473
See application file for complete search history.

(56) References Cited

U.S. PATENT DOCUMENTS

| | | |
|---|---|---|
| 2001/0037500 A1 | 11/2001 | Reynolds et al. |
| 2002/0042923 A1* | 4/2002 | Asmussen et al. ............... 725/92 |
| 2006/0271974 A1* | 11/2006 | Gaydos et al. .................. 725/86 |
| 2007/0180470 A1* | 8/2007 | Gill et al. ......................... 725/52 |
| 2007/0245388 A1* | 10/2007 | Shen ............................... 725/87 |
| 2008/0222201 A1* | 9/2008 | Chen et al. ................. 707/104.1 |
| 2010/0269144 A1* | 10/2010 | Forsman et al. ................ 725/92 |

FOREIGN PATENT DOCUMENTS
WO      WO 01/22725 A1      3/2001

* cited by examiner

*Primary Examiner* — Kristine Kincaid
*Assistant Examiner* — John Schnurr

(57) ABSTRACT

A centralized Content Management System ("CCMS") facilitates management of packages comprising assets comprising meta-data and associated content of video programs for distribution to various types of service providers and equipment locations therein. The CCMS can receive meta-data and associated content, normalize the meta-data according to various formats based on various rules depending on where the meta-data and contents are to be distributed, and the distribute the content. The CCMS has various capabilities for managing packages, including adapting the meta-data and content for different types of equipment or individual locations based on rules for that service provider, thus providing an automated system reducing error and time in distributing video assets to a number of locations.

21 Claims, 12 Drawing Sheets

| User Group | User Accounts | System Config. | CCMS Database | Contact Info | Metadata | Content | Reporting Options | Head Ends |
|---|---|---|---|---|---|---|---|---|
| System Administrators | x | x | x | x | x | x | x | all |
| National User | | | x | x | x | x | x | all |
| Regional User | | | | x | x | x | x | regional |
| Local User | | | | | x | x | x | local |

FIG. 9

CENTRALIZED CONTENT MANAGEMENT SYSTEM FOR MANAGING DISTRIBUTION OF PACKAGES TO VIDEO SERVICE PROVIDERS

FIELD OF THE INVENTION

This invention generally pertains to management and distribution of video assets, including television programs, comprising video content and associated metadata. The metadata may be created or modified by a Centralized Content Management System by potentially applying various rules for modifying the video assets and distributing to various destinations.

BACKGROUND OF THE INVENTION

Video service providers ("VSPs") in many cases do not generate the video programs that they stream to their customers. VSPs typically receive these programs from a variety of sources such as program originators or distributors. These video programs include, for example, television programs, network programs, movies, etc. These video programs in turn, must be stored and processed in various systems operated by the VSP. The video programs must be stored in the correct systems based on the type of video, they must be made available at the proper times to the customers of the service provider, viewing of the program must be billed properly for each viewer, etc. Many aspects of the management and distribution of the video assets have been automated, or are assisted by automated systems, but many aspects are error prone, involve human operators, and are logistically complicated.

To facilitate automated processing, "meta-data" is frequently communicated with the video content. The meta-data in a broad sense is descriptive data associated with a video asset. It may identify the title of the video asset, provide an index of various scenes, identify actors, and/or rules identifying how the video program may be displayed, copied, or otherwise processed. In a more narrow interpretation, metadata is defined by industry specification as to what information is conveyed and how it is formatted. However, equipment processing metadata may not always conform to certain structures or normative conventions used by other manufacturers. In other instances, there may be other reasons for editing or updating meta-data present in a system.

BRIEF SUMMARY OF THE INVENTION

In one embodiment, a system receives a video program and related data (called metadata) from a program source, processes at the metadata in a specific manner for a particular destination, and distributes the video program and metadata to one or more destinations. Typically, the processing of the metadata varies according to the destination based on site specific data stored in the system. The system may generate a "national" version of the metadata as well as a "localized" version of the metadata. The system distributes the appropriate version of the metadata based on the destination site that is to receive the metadata. Further, processing of the programming content may also be performed specific to the destination. This summary is intended to only provide a high level summary, and is not intended to limit the scope of the claims herein.

BRIEF DESCRIPTION OF THE SEVERAL VIEWS OF THE DRAWING(S)

FIG. 9 illustrates one embodiment of the CCMS user functional types.

DETAILED DESCRIPTION OF THE INVENTION

Figure 1:
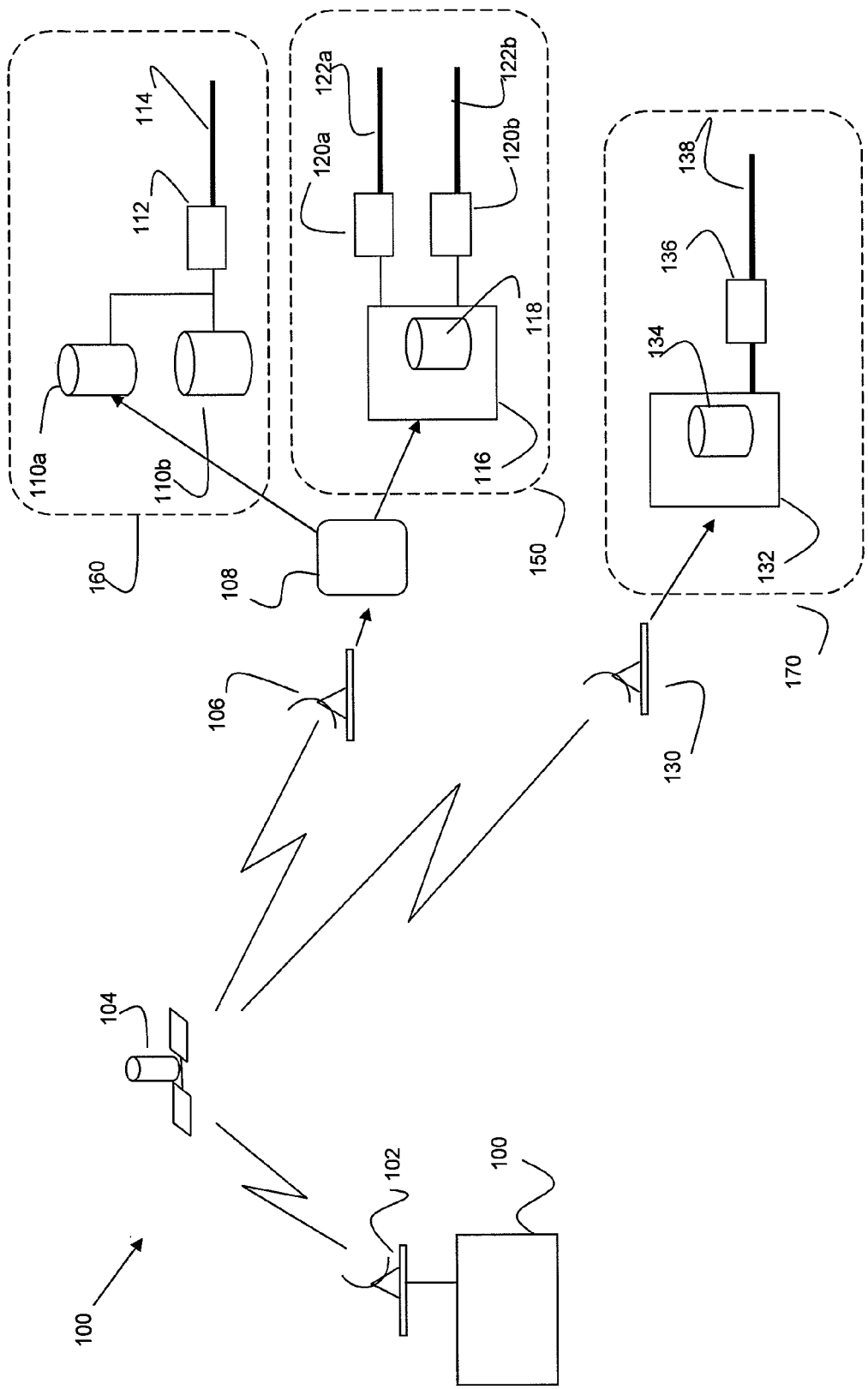
FIG. 1 illustrates a prior art distribution of a video asset from a source to various destinations.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer-readable program products. It should be understood that each block of the block diagrams and flowchart illustrations, respectively, may be implemented in part by computer-readable program instructions, e.g., as logical steps or operations executing on a processor in a computing system. These computer-readable program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

Accordingly, blocks of the block diagrams and flowchart illustrations support various combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The term "video asset" is sometimes used in the industry to broadly refer to a digital video program, and/or data pertaining to it. As used herein, a "video asset" is used to refer to a component of a digital video "package" wherein the video asset comprises video content and metadata in the package. While a "package" can generically refer to a video asset at a high level, as used herein it refers to one or more structured data components comprising content and/or metadata, which are typically structured according to an industry or equipment manufacturer's specification, such as specified in Metadata Specifications: CableLabs® VOD Content Specification Version 1.1, MD-SP-VOD-CONTENT1.1-I05-060831, 2006, the contents of which is incorporated by reference.

Typically, the video content is in the form of an MPEG encoded digital video file, based on one of the standardized encoding schemes, wherein the video represents a series of digital images of physical objects, that is recorded using a recording device.

Figure 11:
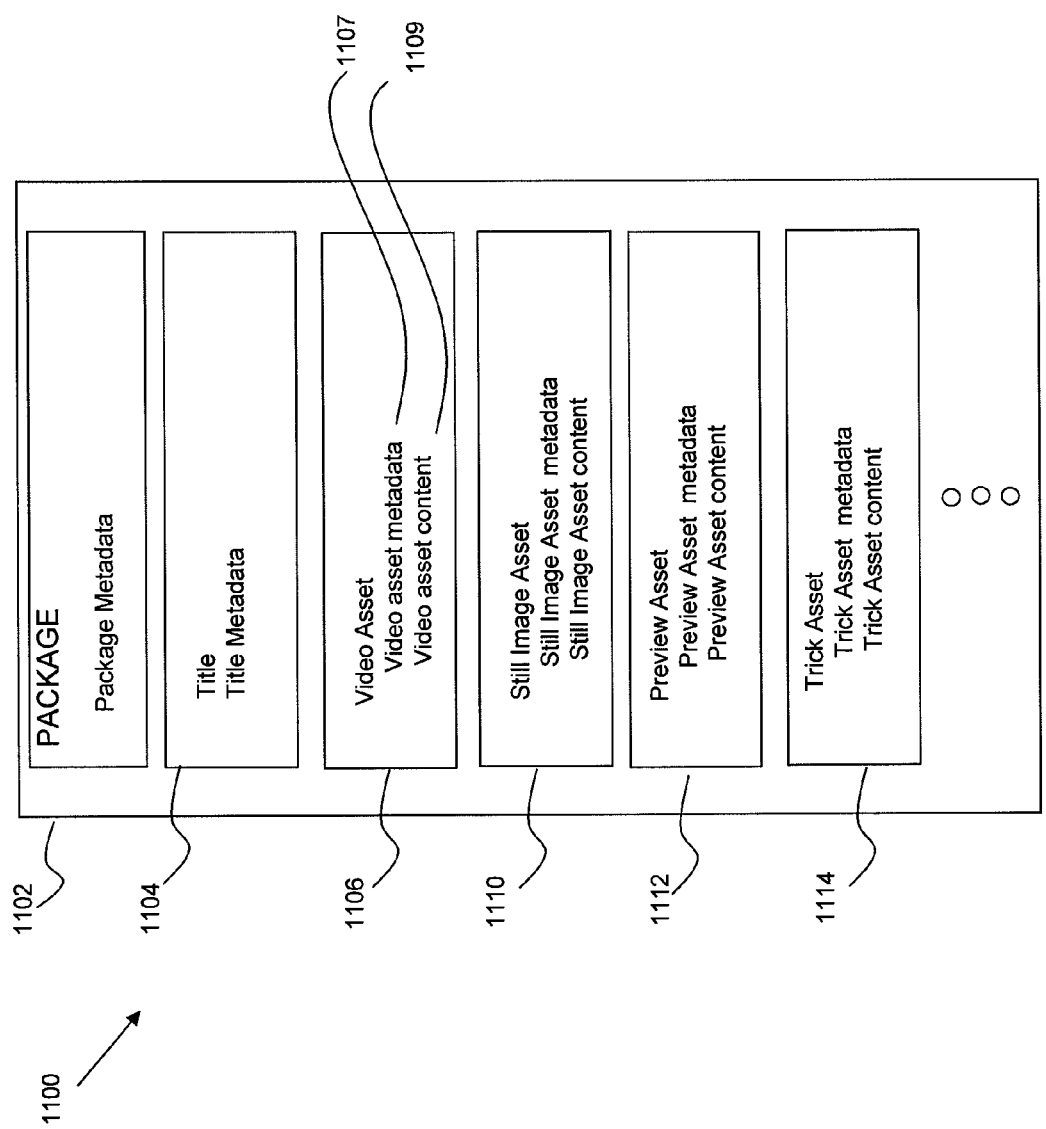
FIG. 11 illustrates one embodiment of a package.

One such data structure for a package is shown in FIG. 11. In FIG. 11, the overall data structure 1100 comprises data that identifies the package 1102, which also includes information about the package in a sub-structure termed "package metadata." The metadata includes the name of the asset, version information, creation date, provider identifier, and other various class, action, tier, and version information.

Associated with the package is also a sub-structure called "title" 1104, which also comprises title metadata, which is information about the title. The title comprises information about the description of the asset, identifier, version number, actual title per se, summary of the movie, rating information, pricing information, year of release, close captioning content indication, country of origin, actors, directors, genre, rating, etc.

Further associated with the package is the video asset (a.k.a. "movie" asset in other metadata specifications). Although a package comprising a "movie asset," the asset does not necessarily have to be a movie per se. It may be other forms of video programming, such as a game show, documentary, sports game, music video, etc. Thus, when the term "video asset" is used, it encompasses a "movie asset" but is not limited to a movie, and may be other forms of programming.

The video asset comprises the video asset metadata, which comprises identifier information about the asset, whether it is encrypted, audio type, screen format, language identifier of the sub-titles, whether it is dubbed from another language, copy protection information, etc. The video asset also comprises the video content, which is typically an MPEG digitally encoded file of the video content itself.

Other assets may be associated with a package. Obviously, when distributing a movie from a program originator to a cable service provider, for example, the movie itself must be transmitted. However, in addition to the movie, other related information needs to be transferred to the cable service provider. The movie is typically advertised with "trailers" or with still images ("movie posters"), as well as other assets.

These other assets are shown in FIG. 11 and comprises the still image asset 1110, which comprises the still image asset content (the image itself) and metadata about the still image. Similarly, the preview asset 1112 ("trailer") typically is used in promoting the movie and comprises the preview asset metadata and the preview asset content. The trick asset 1114 may have a version of the video content encoded for trick mode (e.g., pause, rewind, etc.).

Typically, when importing and exporting a package, at least the title and the movie asset portion are provided. However, in some instances, other assets may be sent separately. For example, it is possible to receive a package for a title, which includes the preview asset and/or still image asset (e.g., movie "trailer" or poster image) and not the movie asset. That is because the preview asset and/or still image asset would typically be provided in anticipation of the availability of the movie, in order to the video service provider to market and promote the movie by the video service provider. Then, shortly before the movie schedule for showing, the package with the movie asset would be sent to the video service provider.

Thus, the term "asset" is broadly used herein to mean any of the above assets, and reference to a "video program" generally refers to one of the assets, or a portion of an asset, that may be in the package. Thus, a video program and package are very similar in concept, and the terms may be used interchangeably. Oftentimes a package includes at least the video asset, but it may not. For example, it is possible to update the title information for a package by only sending the updated title metadata without re-transmitting the video content. In some instances, for convenience, reference will be made to the "video content" or "video metadata", which refers to the video asset content and the video asset metadata respectively.

Background of Package Distribution

The distribution of packages (including video assets comprising content and meta-data) can be illustrated in one prior art embodiment as shown in FIG. 1. This is useful for illustration various complexities that can occur when distributing packages to multiple destinations.

A video program is produced by a program originator 100, which can be a source of television programs, live sports programs, movies, etc. In one embodiment, the originator 100 uses an earth station transmitter 102 to upload the video program to a satellite 104, which relays the program to a plurality of recipients. In many instances, the program source 100 also transmits meta-data, so that a package (content and meta-data) is being transmitted. It is typically the case that the video content and the meta-data are transmitted together, either as concatenated files or as a single file.

The package is then transmitted to a number of earth stations 106, 130, which each receive the same information. Consider one embodiment where cable service provider ("CSP") 170, as illustrated by the dotted line, controls and operates equipment comprising a cable headend, and receives the package from the earth station 130 at a system 132. The cable service provider 170 may receive the package, perform some processing on the video content by the system 132, and may even store the package in a content store 134. The video content may be streamed at a later time to viewers over cable headend 136 using the cable distribution network 138. Alternatively, the video content may be streamed in real-time. The video content may still be stored for viewing an on-demand basis.

Simultaneously, another earth station 106 receives the same package, and provides the package to a processing system 108, which then distributes the package to two cable service providers, 150, and 160. In the case of CSP 150, a further processing system 116 may receive and store the package in content store 118, which can be streamed in real time over a headend 120a and cable distribution network 122a. Similarly, the program can be made available over another cable headend/distribution network 120b, 122b. Thus, CSP 150 may have two different cable headend systems that stream the program (or otherwise make it available to subscribers on an on-demand basis). Alternatively, the video content maybe stored in the content store 118 for subsequently viewing at the request of the viewers.

On the other hand, system 108 can distribute the package to another CSP 160, which has two content stores 110a, 110b. While it is possible both may receive the program, most likely only one of the content stores 110a receives and stores the program for real-time or on-demand viewing by providing the program to the cable headend 112 for distribution over the cable distribution plant 114. Thus, CSP may have various content stores for storing programs, and the video asset is stored by the database having available capacity.

In the above scenarios, systems 108 and 132 receive a package and store the asset in various databases. Such systems typically receive and process the meta-data and index it as appropriate. Typically, the video asset metadata is used to provide an on-demand service. Consequently, the metadata is used by systems for facilitating the user to subsequently select and identify the video content for retrieval. Further, although not shown, the program originator may also transmit the same program or other programs to other destinations using a program distributor employing land-based facilities.

The above scenario can be used to illustrate the difficulty in resolving various aspects pertaining to managing and tracking distribution of the package. For example, it is possible that CSPs 160 and 170 are operated by a common entity, in different parts of the country. These different serving areas may have different prices for similar services. Typically, an urban area may not have the same prices, nor same services made available to viewers, as provided in a rural or suburban area. Further, in the case of CSP 160, the two content stores 110a and 110b may represent different equipment vendors with slightly different processing requirements. For example, the package data structures may not conform to the same requirements. The same may be said of cable headends 120a and 120b. Given such possibilities, the following questions are difficult to resolve in the architecture of the prior art:

How does the program originator 100 know which CSPs actually received the package? How does the program originator know which CSPs should receive a particular instance of a package?

If there was an error in creating the meta-data for a package that is discovered after the package has been distributed by the program originator, how does the program originator know which receiving entities should be notified? Further, how is the corrected version communicated?

How are modifications to packages accomplished, when the packages have already been transmitted to some receiving entities? What if only certain receiving entities are to receive the updated information? How is this information tracked?

Since all receiving entities on a satellite receiving system receive the same package, how are modified versions of the package created and distributed for different a) headends of a CSP, b) different CSPs, or c) different serving locations?

If a CSP obtains locally produced video programming, how is a package comprising that video program created for that CSP then distributed to related cable headends affiliated with the CSP? What if the other cable headends require slightly different versions of the package?

Since cable headends have a finite amount of storage capacity for video assets, how does the CSP know whether, and for how long, to store a video asset? How can the CSP be informed of when upcoming assets will be sent in order to plan accordingly?

It should be evident that the prior art distribution architecture does not lend itself to easily resolving these questions. For example, assume that CSP 160 and 150 are commonly controlled by a single entity and that system 108 serves as a single point for receiving and distributing packages to these CSPs. Once the package is received by system 108, they are distributed to systems 116 and content store 110a as appropriate, but there is no "visibility" of this to the program source (or any other party) as to where the package was actually distributed. Consequently it is not easy for the originator (or a third party) to direct updates, corrections, queries, or other information to the recipient of the original package.

To further complicate matters, consider that a program originator may be transmitting a number of packages over a time period to a CSP. For example, a television network source may be providing dozens of packages for each day's programming to a CSP. Multiply this aspect with the fact that the CSP may be providing hundreds of programming channels simultaneously to its subscribers. Further, consider that some CSPs may be operating multiple cable headends simultaneously in multiple cable systems across the country. Literally thousands of hours of programming may be received by a CSP from numerous sources in a day's time. Under these circumstances, the above exemplary questions regarding tracking and managing packages can become very complicated and consume significant personnel time, particularly when complications arise. For example, many CSPs provide the same programming to different cable markets, but price the same programs differently based on the location. Alternately, certain programming may be distributed to some markets but not others. For example, programs related to a state championship high school football game would only be relevant to cable systems operating in that state. Thus, it appears that systems and methods are required for tracking, distributing, and managing video-based content.

Various embodiments of the present invention will be illustrated in terms of providing video assets referred to as a "package", which usually comprises video content and associated meta-data. In some instances, a "package" can comprise meta-data only, such as when updating meta-data occurs (and hence there is no need to redistribute the video content). Frequently, the video asset may be a video program in the form of a movie, but other types of video programs (such as commercials, previews, television programs, game shows, reality programs, user generated content, etc.) are possible. Further, various embodiments are described in terms of a cable service provider ("CSP"), but other embodiments may involve other forms of video service providers ("VSPs") providing video content using wireless technology to mobile phones, broadband delivery systems, fixed wireless providers, or other technologies. Thus, embodiments could apply to video service providers in the form of cable service providers, Internet providers, cellular telephone providers, and WiFi providers.

High Level Summary of CCMS

One embodiment of the present invention is to facilitate management of distributed packages by enabling the separate management, distribution, and tracking of the video content and associated meta-data. One embodiment comprises a system, called a Centralized Content Management System ("CCMS") which typically interfaces with both program originators (a.k.a. a program source) and one or more video service providers ("VSPs"). The management of packages involves a number of aspects, including but not limited to:

a) determining the receiving entity for a package,
 b) processing the initial receipt of a package from a program source and normalizing or customizing the package for the destination,
 c) updating packages, and
 d) removing assets from storage when they are no longer necessary.

The CCMS acts as an intermediary between the program source and the program destination and performs various functions. These functions vary and can depend on the destination or deployment configuration. The CCMS facilitates distribution management on behalf of the program originator and can adapt to different functionalities performed by the receiving systems. In addition, the CCMS facilitates tracking the package and creating customized versions of the meta-data for the recipient. The CCMS typically interfaces with a Local Content Management System ("LCMS") located in the receiving system that performs various functions in cooperation with the CCMS. Various levels of functionality in the LCMS are accommodated, including an LCMS that is "smart" and can provide various functions, including processing of packages based on various established rules. In other embodiments, the LCMS performs limited functions and processing on packages, and instead relies on the CCMS for applying various rules in processing the package. A range of intermediate capabilities are possible in dividing the functions and processing between the CCMS and the LCMS.

In various embodiments the system described herein can be part of a service bureau. Specifically, a third party entity may operate the CCMS and provides a service either to the program originator, the VSP, or both. The CCMS system could be dedicated for a particular VSP, or could be shared for various VSPs. Alternatively, the CCMS can be a product which is sold or leased to the VSP or program originator, which operates and controls the CCMS for accomplishing the same functions. Other ownership arrangements are possible. Further, the LCMS may be a product provided as well.

High Level CCMS Overview

Figure 2:
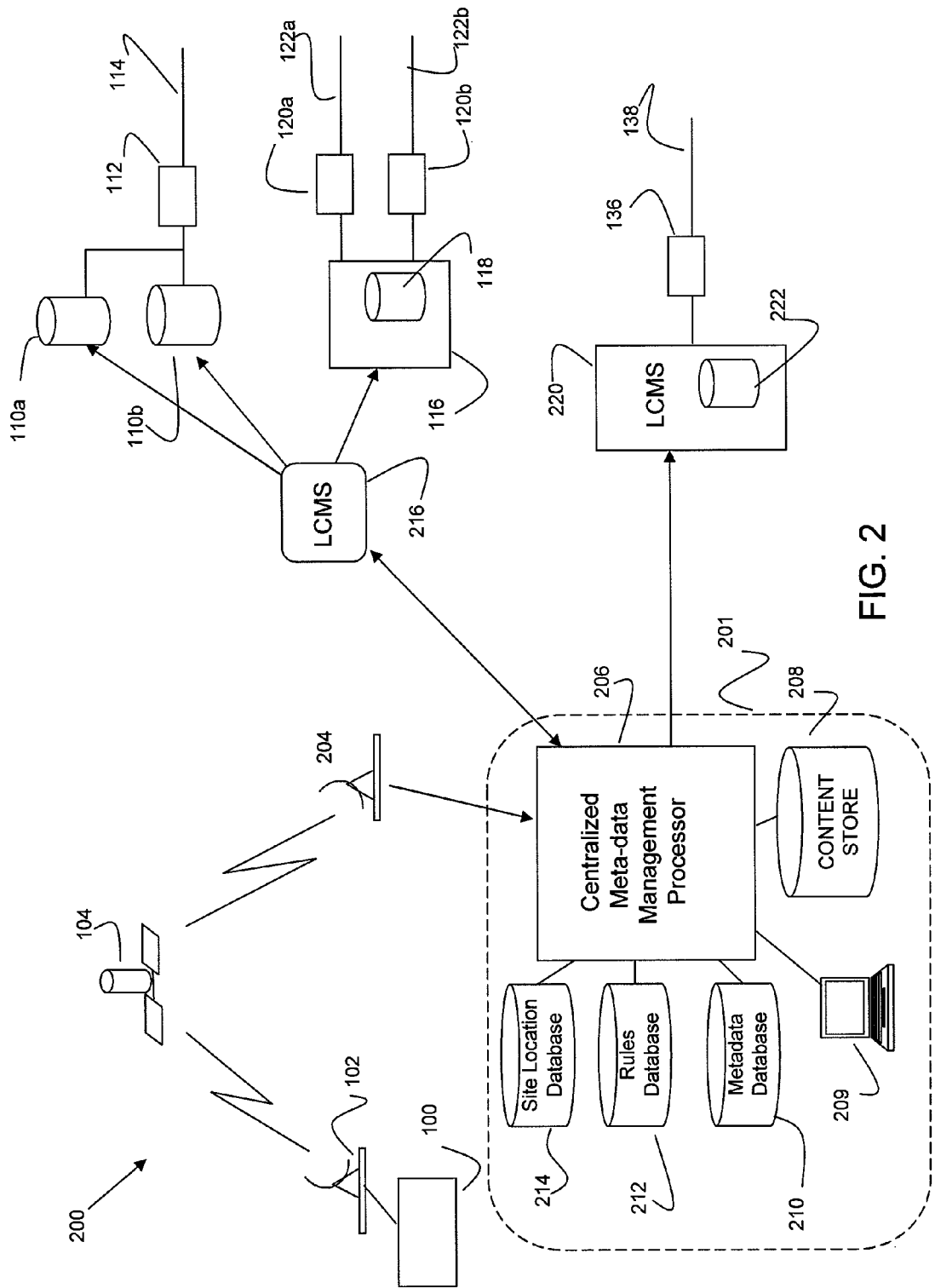
FIG. 2 illustrates one embodiment of the deployment of the CCMS system in relation to originator and destination systems.

A high level overview of the CCMS system is shown in FIG. 2. This represents one embodiment of the CCMS, and other embodiments and deployment applications are possible. However, this embodiment is useful for presenting some common applications and capabilities of the CCMS. In FIG. 2, system 200 comprises a program originator 100 which transmits programming using an earth station 102, which is received by satellite 104. However, in this embodiment, the signals are received by an earth station 204, which provides the video asset or package to the CCMS 201. Thus, the CCMS acts as the recipient of the package on behalf of the cable service providers. The CCMS then decides which destinations are to receive the package, and may customize the associated meta-data in the package in the proper format for the destination. In FIG. 2, the CCMS 201 provides the package to the LCMS 216 and the LCMS 220. There maybe other CSPs (not shown) that receive services from the CCMS, but which do not receive this particular package. Further, other types of VSPs may be served. Thus, in the case where the CCMS services a number of VSPs, typically not all the VSPs receive the same package or version thereof.

The CCMS typically retains a copy of the original package (sometime called the "raw" version) or a portion thereof in a content store 208. In this embodiment, the video content of the package is stored in content store 208 and the meta-data associated with the package is stored in the meta-data database 210. As will be seen, the meta-data database 210 may store different versions of the meta-data and metadata for different assets in the package.

The CCMS system also comprises a site location database 214 that stores various site-related information, which includes video server provider site specific configuration data. This would include information as to which video service provider sites (destinations) are to receive a package, how metadata is to be customized for that site, when the site is to receive the package, etc. The term "site" refers to a system receiving the package, and could refer to multiple cable headends of the same CSP, a LCMS, or different cable headends of different CSPs. Other arrangements are possible. Different types of VSP may be accommodated as well. The site location database knows about the different locations the CCMS can send a package to, and typically maintains information not only about the addresses, but also information whether multiple locations are affiliated with the same CSP and how to tailor the content as well as the metadata. Thus, the CCMS knows about different CSPs and different locations within a CSP that can receive a package. The site location also stores other information about each site, such as customized versions of the meta-data that each location is to receive.

In order to accomplish the above, the CCMS system 201 typically maintains a rules database 212, which maintains various rules for processing packages from a program originator. Many of the rules are applicable to a site, or set of sites, or can be system wide. Further examples will illustrate the rules and applications thereof.

At a high level of operation, the CCMS 201 receives a package from an originator, stores an original version of the package, it may normalize the package to conform to system wide rules thereby generating a normalized package instance, and then processes the normalized package as appropriate for each site thereby generating localized package instances. The various versions of the assets are also called "instances." Various rules may be applied in order to create an appropriate localized version of the package for the site. The CCMS may then transmit the package at a scheduled time to the appropriate destinations. The CCMS is shown as comprising a processor 206 which interacts with the various databases 208, 210, 212, and 214. However, as will be seen, there are other deployment configurations and architectures of the CCMS that are possible.

The process of receiving a package into the CCMS is sometime also referred to as "importing" a package, and the process of distributing a package is also referred to as "exporting" a package. The process of importing a package and altering the meta-data and/or content based on rules is also sometimes termed "normalizing" the package. The original version that is modified and applied to various sites or locations of the country can be called a "national" version or instance of the metadata or package, whereas a site specific version is called a "local" version or instance of the metadata or package. Thus, the original, national and local versions of the video program are generally similar, but may be encoded differently, or have different ads inserted, etc. There may not be clear distinctions in various embodiments as to what constitutes a national version versus a local version, as the perspective of what is a national or local version can vary based on whether the CCMS' or VSP's perspective is taken into account. For example, a cable system operator with 25 cable headend is receiving packages from the CCMS may receive the same package in some instances, and view that as a "national" version, but in reality, it is different from packages provided by the CCMS to another cable service provider. In other embodiments, the national version is completely independent any potential destination that may receive an instance of the package.

LCMS Overview

The LCMS 216 and 220 of FIG. 2 is the system that receives the package from the CCMS. In many instances, the LCMS receives a "localized" version of the package. The LCMS in turn, may further distribute the package to various equipments, such as databases 110, VOD servers 116, or other equipment associated with the LCMS. The function and capabilities of the LCMS vary, as the CCMS can accommodate a variety of capabilities of LCMS. In one embodiment, the LCMS can be a system managing assets, as a VOD system. This could include systems which have minimal cooperation with the CCMS. In another embodiment, the LCMS may incorporate capabilities designed to interact with the CCMS, and perform tasks at the request of the CCMS. For example, the LCMS may receive updated meta-data to associate with a package (as in updating errored meta-data previously received), respond to queries from the CCMS (as to what packages are present), respond to commands from the CCMS (such as delete a particular package), or other functions. In typical applications, the LCMS receives packages from the CCMS and updates the appropriate servers and systems. However, in certain instances, it is possible that the LCMS may be a source of a package to the CCMS. Generally, the greater the cooperation of the LCMS with the CCMS, the greater the overall system functionality that can be achieved.

Importing Packages

Figure 3:
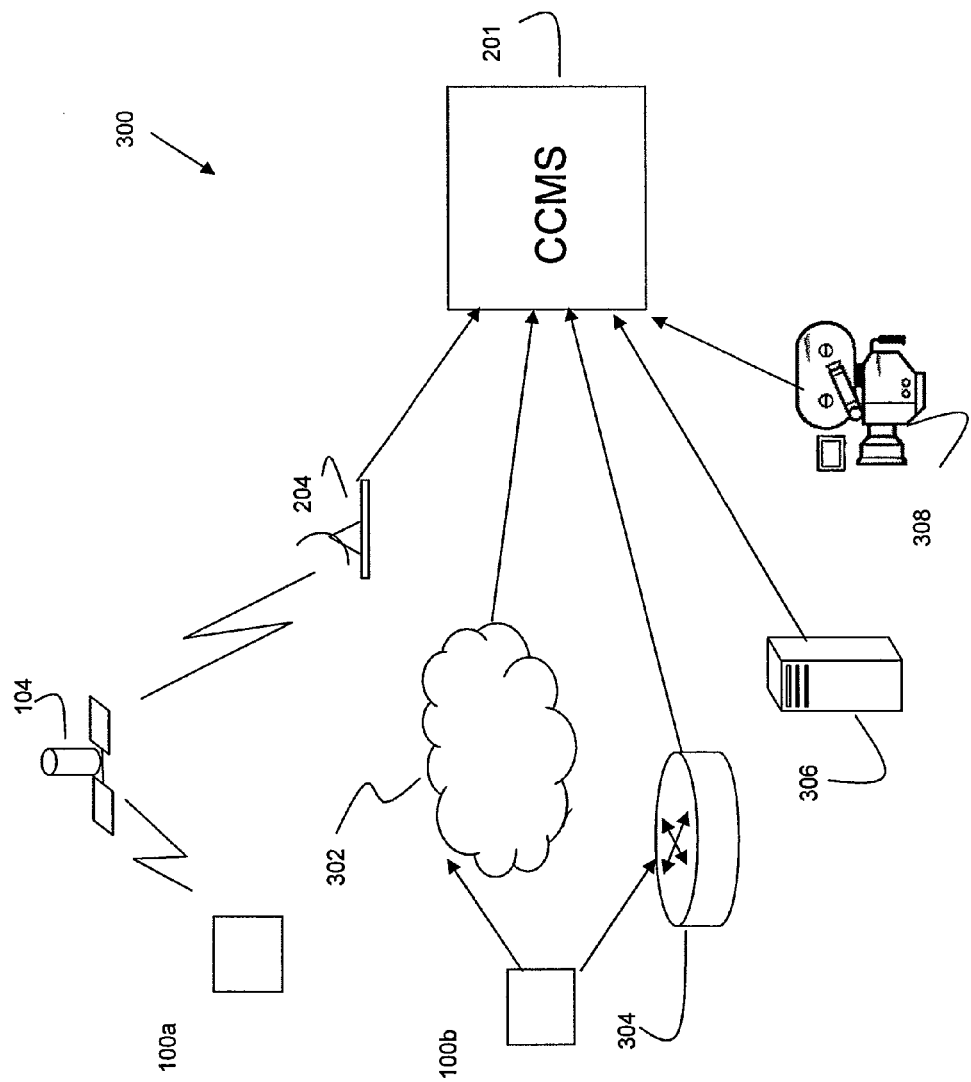
FIG. 3 illustrates one embodiment of the CCMS importing video assets from program originators.

The embodiment of FIG. 2 illustrates one embodiment where the CCMS imports a package from a program originator via a satellite link. In other embodiments, the CCMS receives packages from a variety of sources and in a variety of ways. FIG. 3 illustrates some of the ways a package may be imported by the CCMS and the different type of program originators.

This illustration is not intended to be exhaustive. In FIG. 3, the system 300 is shown as comprising a CCMS 201 having a variety of input interfaces to a number of program producers. The approach of receiving packages from an earth station 204 receiving streamed packages from a satellite 104 was discussed previously. The program originator 100*a* in this case could be a television network producer or a broadcast network. Although a satellite system is shown, other forms of wireless distribution can be utilized by the CCMS for importing packages.

Terrestrial distribution of packages from programming sources is also possible. Another program originator 100*b* may provide programming using public communication networks 302 and/or private facilities 304. The program provider in this case may be a private distribution network provider of programming to video service providers. One such example includes "In Demand®," a provider of pay-per-view and subscription video-on-demand services. These program sources may use the services of the aforementioned satellite distribution network, a distribution network 302, the Internet, or a communications service provider.

In addition, packages can be received from a library 306, which can be a database or other type of content store, which is local or remote from the CCMS. The transmission of the package could be accomplished by providing the media (e.g., tape, CD, or other storage medium) that is loaded into the CCMS or streaming them over facilities. The program source could be, for example, an archive of videos access by the CCMS. Alternatively, the program store could be operated by a television network, service provider, or independent video producer. Alternatively, the system 306 could be an asset management system that receives video and creates the meta-data, thus creating a package based on a video file it stores. One form of an asset management system comprises equipment that is able to select a program based on a request, and stream the content to an indicated destination. For example, system 306 could be a VOD server-like system.

In one embodiment, the system 306 represents a LCMS which provides a video package to the CCMS. This is a special case of the LCMS, since typically the packages are usually sent from the CCMS to the LCMS. However, it is possible that a video service provider may generate their own video, which is used to create a package at one VSP location, which the video service provider desires to distribute to its other service provider operations. For example, a CSP in one urban area may produce a documentary and generate a video asset (comprising the video content and associated meta-data). Assume that the CSP operates cable systems across the country (or can be affiliated with other cable systems), and desires to distribute the package to its affiliated cable system operators. Since the LCMS is already connected to the CCMS for receiving other packages, it makes sense to use the CCMS to distribute packages to the other destinations. This can be easily accomplished by having the LCMS upload the package to the CCMS and having the CCMS distribute it to the other locations. It is possible that the CCMS could even update the meta-data and transmit it back to the originating LCMS.

Finally, the CCMS could potentially receive or generate the video content itself by a video source 308 and create a package. However, typically, video is processed into a package (such as by using the aforementioned asset management system or other package creation tool) and then provided to the CCMS as opposed to the CCMS receiving video itself and creating the package. Thus, typically, the video would be provided to another system (e.g., system 306) that then creates and provides the package to the CCMS.

In summary, FIG. 3 illustrates the variety of types of video package programming originators and the variety of mechanisms that can be used to import a package to the CCMS. Typically, the CCMS is often receiving programming from a number of different sources and over a number of input transmission methods. The CCMS may ensure security in receiving packages by providing identification and/or verification mechanisms. For example, the CCMS could incorporate the encryption scheme disclosed in Systems And Methods For One-To-Many Secure Video Encryption, U.S. patent application Ser. No. 12/425,944, filed Apr. 17, 2009. Other security and authentication systems well known in the art can be employed.

Exporting Packages

Figure 4:
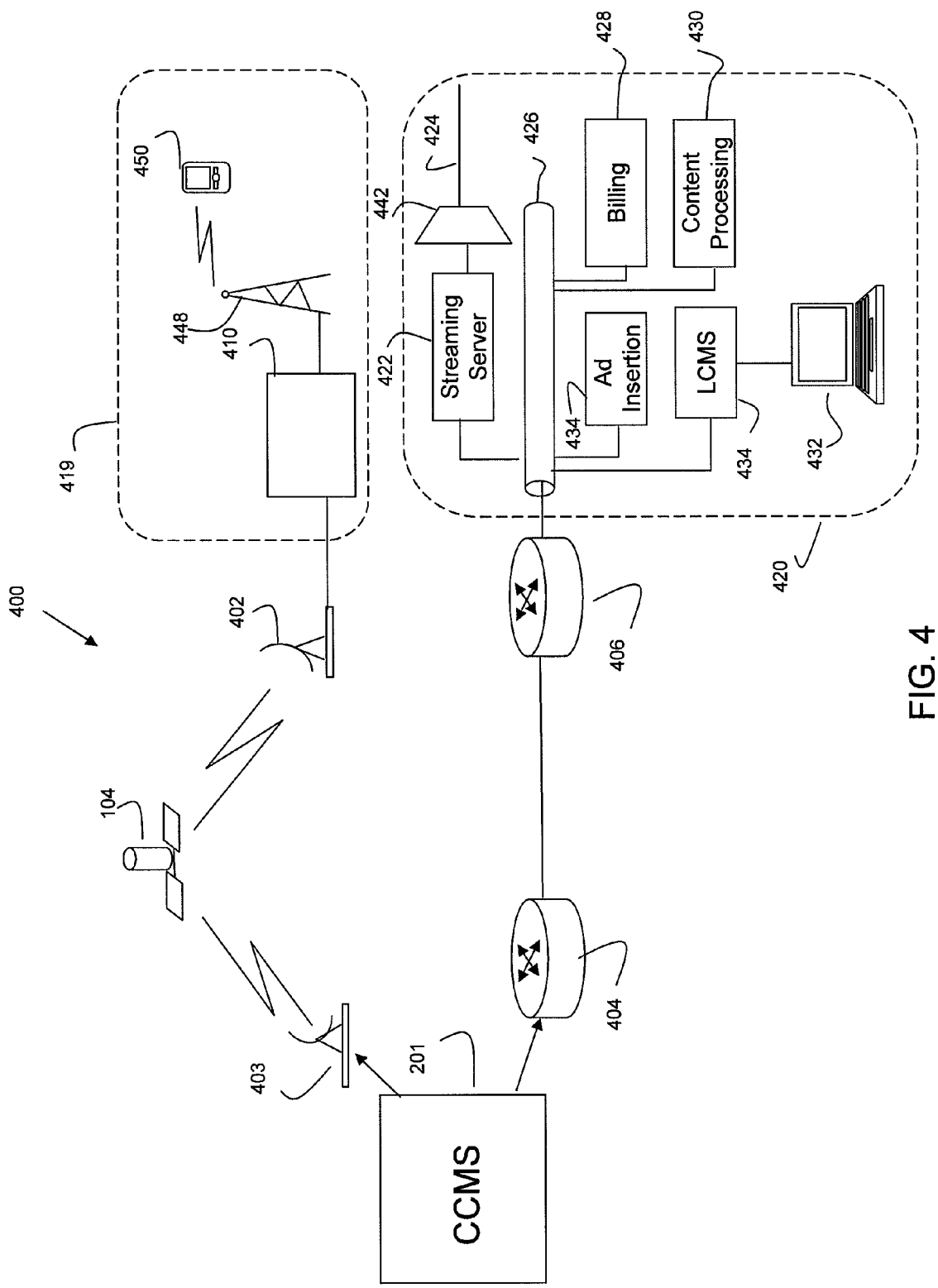
FIG. 4 illustrates one embodiment of the CCMS exporting video assets to destinations systems.

The embodiment of FIG. 2 illustrates one embodiment where the CCMS provides or exports a package to one or more CSPs. In other embodiments, the CCMS provides packages to a variety of video service providers and in a variety of ways. FIG. 4 illustrates some of the ways a package may be exported by the CCMS to the different type of program destinations.

In FIG. 4, the distribution system 400 comprises a CCMS 201 which is able to send the package to a variety of video service providers using a variety of transmission mediums. In one embodiment, the CCMS uses an earth station 403 to transmit the package to a satellite 104, which then relays the signal to a receiving earth station 402. This provides the package to a receiving system 419, which may store and make the package available to its subscribers on an on-demand basis. In this embodiment, video service provider 419 is a cellular provider that operates a wireless base station 448 that provides the videos on demand to mobile telephones 450. In this embodiment, the video service provider may comprise various content servers and processors in the system 410 that receive, catalog, and transcode the video content as appropriate for their cellular subscribers. The degree of functionality performed by the system 410 can vary, as some functions can be performed by the CCMS. For example, as will be seen, the CCMS could transcode the video content into the proper format when exporting the video content to the VSP 419. Thus, the video service provider does not have to (but may) incorporate a transcoder functionality in system 410.

In other embodiments, the video service provider 419 could be a wireline based Internet provider, fixed wireless video distribution provider, etc. It is possible that the system 410 may receive content from the CCMS, but not be remotely managed by the CCMS. That is, the system 410 may be a system that does not incorporate any functionality for being managed by the CCMS. In such a configuration, the overall system does not provide all the benefits as if the system 410 did incorporate some LCMS functionality for interacting with the CCMS to manage the assets.

Another embodiment is shown in FIG. 4 involving a CSP 420, which operates a hybrid fiber coaxial network 424. The CCMS transmits the packages over terrestrial facilities involving an originating router 404 and a destination router 406, although other facilities may be involved. The packages are received by the CSP at a LAN 426, and provided to a LCMS 434 connected to the LAN. There, a local administrator may review and manage the input using a user interface embodied in a personal computer 432. The CSP operator may operate other systems typically found in a cable system, including a billing system 428 which renders subscriber's bills, an ad insertion system 434 for inserting various local ads into and between video packages, a streaming server 422 which may store the content and provide it to a headend 442 that multiplexes the video content out over the cable plant 424. The system 420 may also comprise a content processing system 430, which can comprise further components for adding watermarks to the packages, encrypting/decrypting packages, transcoding, processing bookmarks (also known as "avails"), and detecting frames. Other functions may be variously performed by the CSP as known in the art. Although typically the CCMS creates localized metadata versions for a site, the CCMS may also generate localized content versions as well.

In this embodiment, the CSP relies on the LCMS to receive the package, and upload it as required to the streaming servers 422. The streaming servers can be VOD servers, which store, index and make available packages to the subscribers on demand. The LCMS typically interacts with the CCMS to load, delete, and other manage the packages. In some embodiments, the CCMS may interact directly with the VOD servers.

Although FIG. 4 illustrates only two video service providers, there may be others connected to the CCMS. If the CCMS is acting in a service bureau context, it may export packages to a number of VSPs. On the other hand, a VSP may own and operate a CCMS that is dedicated to serving its various operations, which can include cable, wireless, or other distributions technologies.

FIG. 4 illustrates one embodiment of a deployment configuration, and other embodiments are possible. These deployment configurations vary based on the functionality of the LCMS, how many cable headends are served by the CSP, how many VOD servers are deployed, whether storage is provided by the LCMS or other existing servers, etc. Those skilled in the art will realize different levels of functionality and interaction between the CCMS and LCMS are possible.

CCMS Overview

Figure 5:
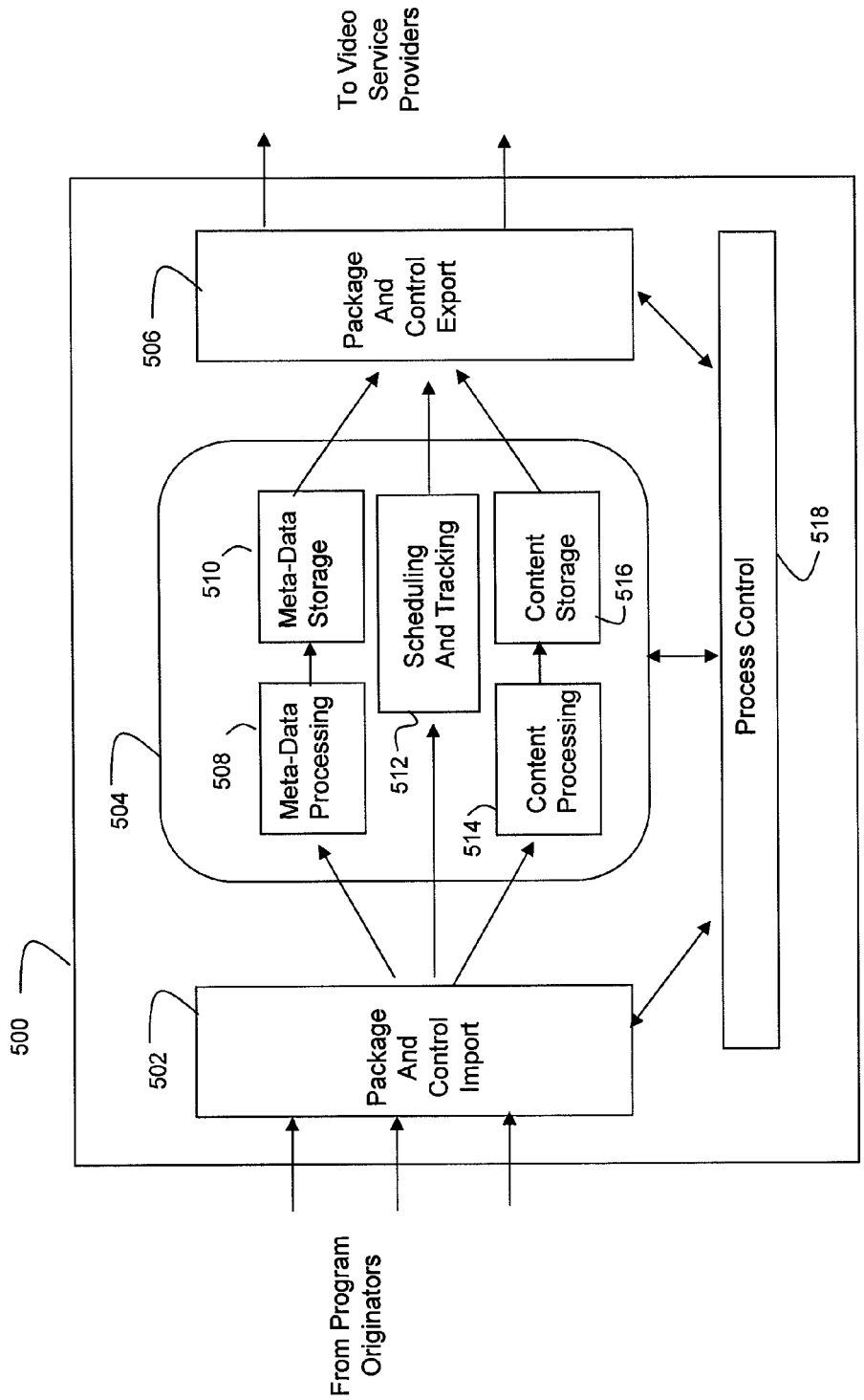
FIG. 5 illustrates one embodiment of the CCMS functional view.

The CCMS itself can be described in various ways, which are intended to be complementary, and not exclusive of each other. First, in FIG. 5, one high level illustration of one embodiment of the CCMS is provided. In FIG. 5, the CCMS 500 is shown as have functions for receiving (e.g., importing) package and control information 502. This function handles the receipt of packages and associated control information from the variety of program originators. The control information may authorize access from the program originator, receive scheduling information about future packages, etc. The packages are processed by the processing logic 504, which in one embodiment comprise a function of meta-data processing 508, content processing 514, and schedule processing 512.

The meta-data processing receives meta-data from the original package and normalizes the meta-data to conform to certain aspects, typically defined by rules. In one embodiment, the processing can be viewed as conforming the meta-data into a national and local version. In terminology associated with meta-data formats, the original version is also known as a "major version" and the normalized national version is the "minor version." The local version can be another "minor" version instance. Typically, the version identifiers are numerical identifiers, and the minor version identifier is subordinate to the major version identifier. Typically, the original version of the package is created by the program source independent of any site, and the national version is also typically independent of any site specific configuration data. This processing involves applying various rules associated with generating the different versions, and the rules may be tailored for different VSPs, cable systems, geographic service areas, etc in order to generate a localized version of the package. Once a localized version is created, the meta-data is stored in the meta-data storage area 510. This is then retrieved when needed. Typically, the original version of the meta-data is also stored. Thus, the meta-data storage typically comprises various versions of meta-data for a given video content. These are related by the system, so that the different versions of a program can be readily identified.

The content processing function 514 receives the content of the package, and processes the content as necessary. The amount and type of processing for a given video content of a package can vary based on various factors, including the destination that is to receive the package. For example, if video content is already in the form required by the destination (or if the destination system uses other equipment to do the processing), then the CCMS may do little, if any, processing on the content. On the other hand, certain destinations may require content processing. Such processing could include: adding watermarks to the content (e.g., logos or other icons identifying the program, source, or network), encrypting/decrypting the content, transcoding the content format from one encoding format to another, inserting advertising avails or advertising itself, etc. In summary, because the destination receiving the package may require the content to be formatted in a certain manner, the CCMS may perform this processing on the content, and then store the content in the content storage 516. Thus, it is possible that a given incoming package will result in various content versions being created and stored in the CCMS.

The processing of the metadata and content are capable of being performed and controlled separately, and thus, various versions of the metadata and content are often present in the CCMS. It may be the case that once the CCMS generates a particular version for a destination, that version (either metadata or content) can be exported to a subsequent destination without having to process the original version. For example, while different video service providers may have different localized metadata versions, they may have the same content version. Thus, in some cases the CCMS is able to assemble a package for a destination by retrieving the appropriate metadata and content to form the assets in a package.

Thus, it is clear that an incoming package may result in various meta-data versions and various content versions being created and stored in the CCMS based on the same original package. Because these all pertain to the video program, collectively, these are referred to as herein as a "title." Specifically, a "title" refers to the set of instances of meta-data and content based from the same original program. Note that the package itself comprises a field called "title" and "title metadata" which refers to the title of the package transferred, but there should not be any confusion whether reference is being made to an overall set of related packages versus a field in the package.

The CCMS also provides scheduling processing. Many of the packages received by the CCMS are expected to be received, based on prior notification. The prior notification indicates which packages will be provided to the CCMS, and may include date, price, time window of availability, etc. This allows the CCMS (and LCMS) to plan accordingly for the receipt of packages. This allows personnel or the system to plan accordingly for different business operations, as well as plan and allocate resources in the various systems. For example, CCMS or LCMS personnel can plan for storage availability for upcoming content. This may require removing or relocating certain packages on the system in advance of receiving the new packages. Further, if the scheduled package is not received, this allows the CCMS to generate an alert or other notification to the appropriate personnel. For example, if the current summer's blockbuster movie is not available the day before its advertised availability, system personnel can be notified can follow up to correct any distribution problems that may have occurred.

Finally, the package and control export 506 function handles the exporting of the package (which typically provides the meta-data and content) and directs the package to the correct destination. A variety of transmission facilities may be used, and a variety of service providers and equipment types may receive the packages. At this point, the packages usually are tailored by the CCMS for each destination so that no additional processing is required of the destination. However, as previously noted, it is possible for the recipient system to perform additional processing on the meta-data and/or content.

The process control function 518 provides the overall coordination among the various system components, allowing them to work in an integrated manner. The Process Control may also utilize other services which are made available to the system. For example, transcoders, storage systems, communication interfaces, etc. (not shown in FIG. 5) may be utilized by the process control in order to accomplish the aforementioned functions.

Key Functions of CCMS

As discussed above, FIG. 5 provides a high level overview of various types of processing functionality in the CCMS. The CCMS can also be described in a functional manner as follows, which is intended to complement, and not supplement the above description. There are various functions provided by the CCMS individually, and in combination when operating with the LCMS. At a high level, the CCMS functionality can be divided in to four categories.

Content Trafficking. Content trafficking allows a CCMS user (or the CCMS itself) to establish and track which packages are supposed to be received from which program originator and which have been received.

The CCMS allows establishment of automatic or manual schedules for the receipt or distribution of titles. The CCMS can be informed of expected packages and provide alerts if the package is not received as expected, or if unexpected packages or content are received. Recall that a package can comprise not only a movie, but the trailer and "posters" (e.g., still images used in promotions) used in advertising various services. Thus, to properly load a movie program on a VOD server, the poster and trailer may be required to complete the service offering. Receiving a package comprising a video asset without the associated promotional content in the form of trailers, posters, etc. could result in an alert to system personnel that an error has occurred. Thus, the CCMS may know what assets are in a package. Certain packages structures are also used to update serial television programs, and hence the CCMS may be aware of certain packages that are expected to be received.

Content trafficking also allows categorization of titles, which is useful for video service providers to create video-on-demand services. Thus, the system administrator can define categories, and ensure that packages are identified in the proper category. It is often possible that a package may be listed in multiple categories. For example, a program may be listed as a "classic", "comedy", as well as in an "actor specific" category. The CCMS can also track packages related to a given title. Specifically, the CCMS can track not only a particular version of a movie title, but all the various content versions and metadata versions that were created for various destinations. In general, the CCMS can perform tracking based any of the various fields in the various assets in a package.

In other embodiments, the VSP does not have any (or limited) LCMS capability for interacting with the CCMS above what the VSP is able to interact with program providers. Thus, the CCMS can send a package to the VSP by emulating a program originator. In this embodiment, the CCMS is able to localize the meta-data (and/or content) for the recipient, but may be limited in commands it can issue to the VSP's equipment. The existing equipment in the VSP may be unaware of whether the CCMS or program source is providing the package. Thus, in some embodiments, the VSP is not able to realize all the potential benefits provided by the CCMS. If the VSP incorporates a LCMS that is able to interact with the CCMS, then the VSP is able to further obtain the benefits cooperating with the CCMS. Consequently, unless otherwise stated, it is presumed that the VSP has an LCMS with the ability to cooperate with the CCMS.

Content Management. Content management is typically one of the core functions of the CCMS. This function receives and processes the metadata and/or content of the incoming packages for each destination site location based on rules stored in the CCMS. These rules can be system wide and/or site-specific. Content management typically includes storing the original package as received, processing the meta-data into a national format, as well as processing metadata into a local format for each site as required. The "national" format can be thought of as a system wide default, where the meta-data is normalized to conform to common rules, either for the CCMS system, a VSP, or both. In one embodiment, the "national" format is a set of metadata parameters to be used for multiple system headends and the "local" format is meta-data that is tailored for a particular headend system, whether it is a cable system, region, or other designation. It is possible to have other, intermediate designations, such as "national", "regional", and "local," or even further levels. However, the embodiments discuss herein will focus on two levels of meta-data (national and local).

The content management related functions receive and store the meta-data and content for each package, and ensure that the proper linkage is maintained. The system will also create and manage the various instances of the package (collectively called a "title"), so that a set of packages based on a common title are created. The CCMS maintains a history log of when each package was created, and the different versions of a title that exist on the system. The CCMS administers the content storage, both on the CCMS and potentially on the LCMS.

In addition, the CCMS performs lifecycle management, which involves determining which packages are maintained, for how long, and when they are removed. Because content store is finite in capacity, packages may be deleted in their entirety at a certain point after creation, or at certain times various instances of package may be removed (and only the original package retained). In other embodiment, the packages may be relocated and stored after a time period in a different storage type, such as an archival content store.

The content management function also typically provides a user-interface to a system administrator, so that the administrator can readily make decisions based on information maintained by the system. For example, the administrator can view a schedule of when certain incoming packages are expected, determine the present storage capacity of the CCMS, view certain schedules for retiring (deleting) existing content, and determine whether there is adequate storage capacity for processing upcoming packages. While the system may automate such determinations, the system administrator can nevertheless usually perform these functions manually by viewing this information and deleting certain packages if necessary.

The content management component also handles the processing of meta-data and the content. The CCMS maintains the various versions of the meta-data and/or content created for an original package (both the national and local versions). As noted, meta-data can be received from a variety of sources and in different formats, such as receipt of an original package typically necessitates conforming the meta-data to a set of rules (so as to create an instance conforming to the "national" meta-data format).

The CCMS can receive meta-data updates from a program source to correct an error in previously received meta-data. Further, the CCMS can allow the system administrator to search and view an identified instance of meta-data and then edit it to correct or add data. After storing the updated meta-data, the CCMS may export the updated meta-data as appropriate to the destination site. If the content had already been distributed to a destination site, the CCMS typically will not transmit the package comprising meta-data and the content again, but merely transmit the package comprising the updated meta-data. This saves bandwidth if there are no changes to the content itself. Thus, if a package was received with a misspelling in the title, and was previously distributed with the metadata indicated the incorrect misspelling, the system administrator can view the meta-data for the package, ascertain it is incorrect, edit the metadata to correct the spelling, have the CCMS transmit the updated meta-data to those destinations that previously received the meta-data with the incorrect spelling, and have the CCMS log the information for future reference by the system administrator.

The CCMS also allows the system administrator to search and change fields in the various metadata, including creating group titles based on meta-data values. For example, the system administrator may create a "Cary Grant" category for a VOD promotion of classic movies starring the actor Cary Grant, and send the updated metadata to the appropriate VSPs. All the packages managed in the CCMS wherein the meta-data includes "Cary Grant" as an actor are identified by the CCMS and grouped into this new category. The updated metadata can (and content) can be sent to destinations as appropriate. Again, all the information is linked as appropriate in the CCMS, so that when the updated packages are sent, the CCMS knows all the various forms and destinations that received the packages.

The content management also tracks the locations of the content files associated with a title. The CCMS may access a variety of storage technologies for storing packages, such as Network Addressable Storage (NAS), Storage Addressable Networks (SAN), Content Distribution Networks (CDNs), etc. There may be multiple versions of a content stored in the system, and at different locations. For example, upon receiving a package comprising content in high definition, the CCMS may also create a standard definition content version which is stored in another location compared to the high definition content version which may be stored separate in another content store. Because the content occupies a large volume relative to the metadata, and because the need to retrieve content (e.g., frequency) varies, certain video content may be stored in "archive" storage as opposed to storage that facilitates ready access. More specifically, the "classic movies" rarely selected may be put in one type of storage whereas a recently release video title may be stored in another type of storage. However, during the aforementioned "Cary Grant" promotion, these movies may be temporarily moved to a different storage area.

Site and Rules Component. In some embodiments, these may be considered as two separate components. The site component manages various site-specific aspects, while the rule component manages rules, which may be specific to a site. Recall that the CCMS creates different versions of the meta-data (and possibly content) after receiving a package. These versions are typically reflected as different files or packages, and are tailored for each recipient, as appropriate. The system administrator creates rules and defines how they are to be applied for an incoming package or for a particular destination. Thus, the rules define the creation of the meta-data values, meta-data versions, content formats, and the distribution of the meta-data and the content. Typically, an incoming package (both content and meta-data) will be sent to a destination, but in various instances only updated meta-data may be transmitted in a package, because the destination already has the content.

Two common instances are possible illustrating this situation. First, the destination may already have received the content, and only requires updated metadata. Second, in certain embodiments, the LCMS may have originated the content in a package, and uploaded it (as a program originator) to the CCMS. The CCMS will create a national version of the meta-data, and distribute the package to other service providers. However, because the original LCMS may have the content in the required form, the CCMS may only distribute the updated meta-data to the LCMS. However, other destinations (which do not have the content) would receive a package comprising meta-data and content.

The site and rules component allows the administrator to add or update rules for processing imported packages against a set of rules, as well as change site data regarding the processing of the rules. The CCMS also allows 'step-wise' processing of packages according to the rules so that the system administrator can view the outcome of each step of the processing, in order to modify or correct the rules processing. This allows the administrator to debug a rule.

The rules themselves often pertain to altering the content or meta-data in some manner. Commonly, the metadata is normalized based on a rule to generate a minor version of the metadata. The "Examples" section provides various examples of rules that can be defined for altering the packages. Typically, the rules can also be indicated as commands by the system administrator. At a high level, a "rule" is typically a script of commands used for prospective processing of imported packages, but rules can also be applied to existing packages. Commands, however, are individual actions individually executed based on input by the administrator. Thus, there is a close relationship between the two.

This also may encompass which recipients are to receive (and/or have received) the packages. This provides for the ability to identify and establish the entities from which the CCMS received information and sent information to. This presupposes that the appropriate site specific data already exists for establishing communication with the destination, authorizing and verifying security information, maintaining personnel contact information in case of difficulties, etc.

The CCMS can also issue a query to the LCMS (provided the video service provider has a LCMS that is capable of responding to a query) and determine whether a package was received, what version was received, whether it was received properly and processed by the recipient system, etc. The CCMS maintains a history of what package was sent to which destinations when, so that a system administrator using a computer interfaced with the CCMS can access this information and can interact to a degree with the LCMS. Thus, the system administrator can readily verify whether a package is present in an identified video service provider. This capability also allows the system administrator to define the package source, the recipient VSP, and schedule content changes. The site management functionality also allows a system administrator (or the CCMS itself) to issue commands to the LCMS to delete packages (or packages stored in the CCMS's storage system).

Content Processing Component. The content processing component concerns processing of the content itself (as opposed to processing metadata). It is possible that upon receiving a package, little if any content processing is required by the CCMS to make the content compatible for a given destination. However, in many instances various processing steps are required, such a decrypting the content, adding watermarks, inserting avails (bookmarks) for placement of advertisement, transcoding, etc. In addition to the CCMS performing these functions, some or all of these functions may be performed by the LCMS. Thus, the CCMS may perform some functions and the LCMS performing other functions, and the CCMS may coordinate the LCMS' local processing of the content after receipt of the package. Because each LCMS may perform different levels of processing, the CCMS can accommodate this via the reference to site-specific rules.

CCMS Architecture
Exemplary CCMS Physical Architecture

Figure 6A:
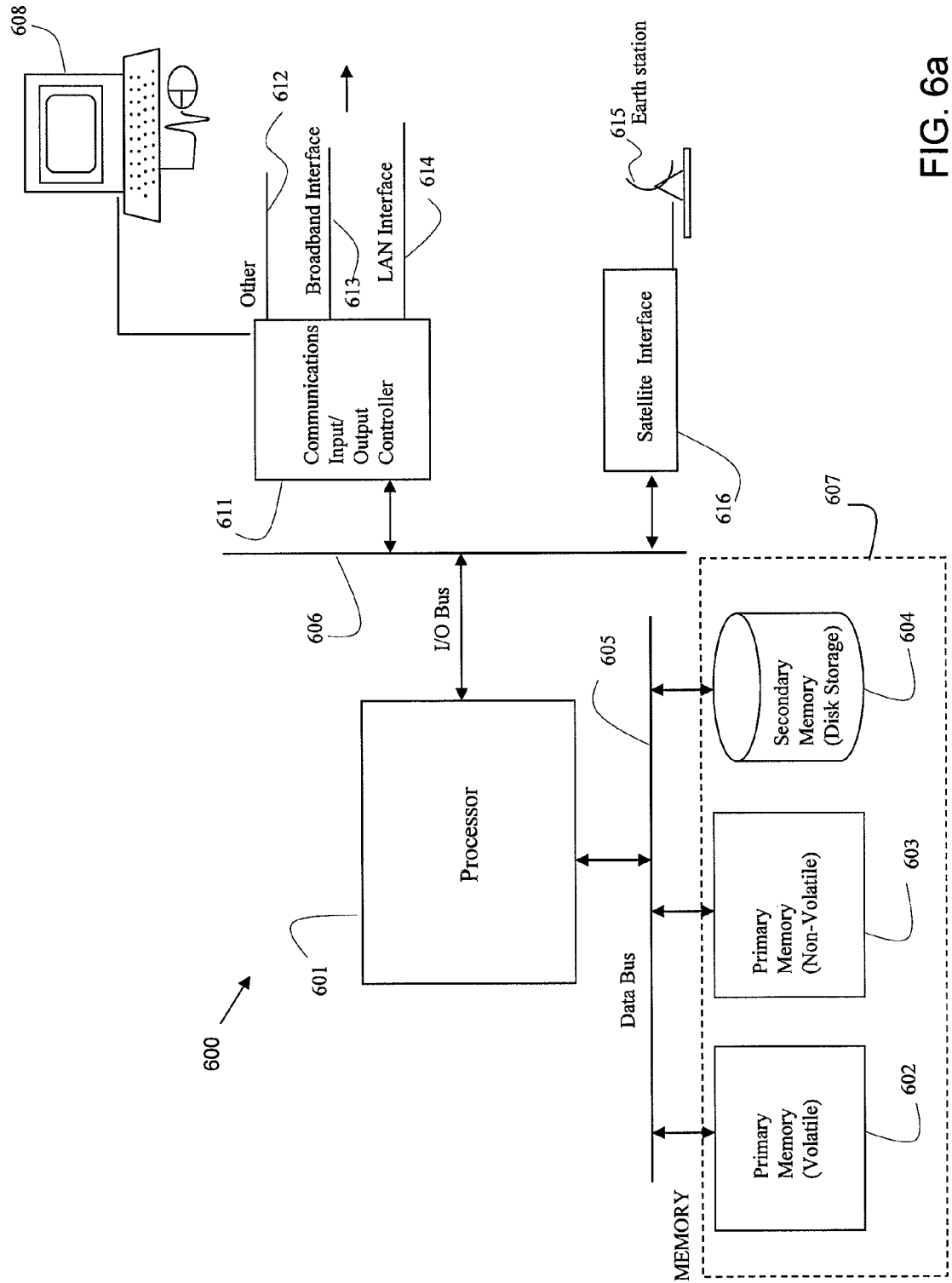
FIG. 6a illustrates one embodiment of the CCMS physical architecture.

FIG. 6a shows one embodiment of the physical architectures of an CCMS. It should be appreciated that various embodiments of physical architecture are possible other than the form disclosed, including using distributed processing and parallel processing of multiple processors. A similar architecture can be used for the LCMS.

In this particular embodiment, the CCMS includes a processor 601 that communicates with other elements within the CCMS via a system interface or bus (e.g., data bus 605 and/or I/O bus 606). Also included in the CCMS is an input/output device typically in the form of a personal computer 608 for receiving and displaying data. This display device/input device 608 may be used by the system user, for example, to interact with the CCMS to create rules, enter commands defining the import/export of packages, edit package data, review search or query results, etc.

The CCMS further includes memory 607, which preferably includes primary memory 602, 603 and secondary memory 604. The primary memory may include both volatile memory 602, such as random access memory (RAM), and non-volatile memory 603, such as read only memory (ROM) or other forms. The non-volatile primary memory 603 may be used to store a basic input/output system (BIOS), containing the basic routines that help to transfer information between components within the CCMS or data to devices outside the CCMS.

In addition, the secondary memory 604 may include a storage device, such as hard disk storage, floppy disk storage, a CD Rom drive, a flash drive, or an optical disk drive, for storing information on various computer-readable media, such as a hard disk, a removable magnetic disk, or a CD-ROM disk. As will be appreciated by one of ordinary skill in the art, the secondary memory 604 is connected to the data bus 605 by an appropriate interface. The secondary memory 604 and associated computer-readable media provide non-volatile storage for the CCMS. It is important to note that the computer-readable media described above could be replaced by other types of computer-readable media known in the art. Such media include, for example, magnetic cassettes, flash memory cards, digital video disks, and Bernoulli cartridges. Other forms of storage may be utilized, such as network accessible storage (NAS), RAID drive systems, etc.

Also located within the CCMS is a communications input/output controller 611 that provides an interface for communicating with other elements of one or more networks, such as the Internet 612, a private or public communication facility 613, and/or LAN 614. It will be appreciated by one of ordinary skill in the art that in certain embodiments, one or more of the CCMS' components may be located geographically remotely from other CCMS components. For example, storage systems for content may be distributed from the main processing system and accessed over one of the interfaces.

The CCMS may also include a satellite interface 616 connected to an earth station 615. This can be used for importing packages, exporting packages, or both. The use of the satellite link may be in conjunction or alternative to the use of terrestrial facilities such as broadband interfaces 613 for sending and/or receiving content. The CCMS may communicate with the LCMS using two types of interfaces, one for communicating packages (including content and potentially metadata) and another interface for communicating instructions/control information. Thus, it is possible for the CCMS to deploy two separate interfaces when communicating with a destination.

Exemplary CCMS Functional Architecture

The CCMS also can be described as a functional or software module architecture, which can be based on the physical architecture shown in FIG. 6a. It should recognized by one skilled in the art that various software architectures are possible, and FIG. 6b illustrates only one possible embodiment, which can be used to illustrate software structure or functions accomplished by software modules.

Figure 6B:
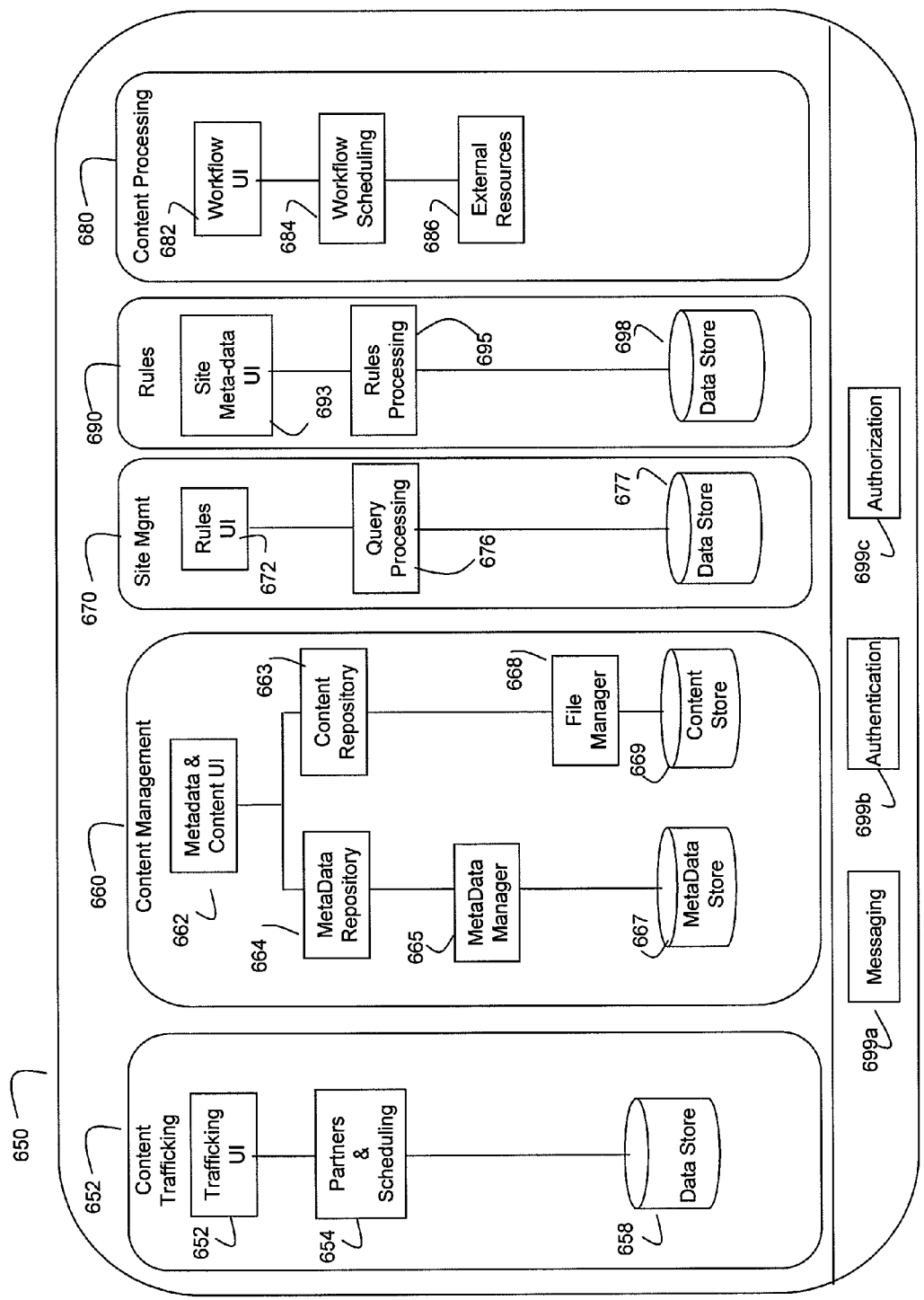
FIG. 6b illustrates one embodiment of the CCMS software architecture.

In FIG. 6b, the functional system 650 can be divided into five main groups of functions: content trafficking 652, content management 660, site processing 670, rules processing 690, and content processing 680. These functional modules rely on various system wide capabilities, which include services provided to the modules for conveying messaging 699a, authenticating packages, etc. 699b, and authorizing program sources, destinations, and system administrators 699c.

The content trafficking module 652 comprises a trafficking user interface sub-module 652, which allows a system administrator to interface with the CCMS for performing the various functions and editing associated parameters. The partners and scheduling submodule 654 processes packages to, and from, destinations and program sources. This handles the communication types and parameters associated with the importers and exporters ("partners") that interface with the CCMS. Also covered is receipt and processing of scheduling information which can describe future packages that are going to be received or sent by/from the CCMS to various partners. This could also encompass schedule information as to which destinations are to receive a package from a content provider. This allows personnel, as well as the system, to verify what specific packages are expected to be received, when, from where, and to where the package (typically a modified package) should be sent. Finally, the CCMS data store retains various data required to perform the above processing, including partner identification, partner communication address and parameter related data, authentication/authorization related data, etc.

In this embodiment, the content trafficking module is where various security management features are defined. This includes features that govern access by the partners that the CCMS system interacts with. For example, the sources from which the CCMS will accept packages from, as well as the destinations to which the CCMS will send packages to, may require various authentication and security measures. The CCMS retains various partner specific security information, such as communication addresses to which packages are sent to, identification data, and authentication data, including encryption/decryption related data. For example, each destination partner may utilized decryption keys in order to decrypt packages send by the CCMS. One such security scheme that may be used when distributing packages is disclosed in U.S. patent application Ser. No. 12/425,944, filed on Apr. 17, 2009, entitled Systems and Methods for One-To-Many Secure Video Encryption, the contents of which is incorporated by reference. The CCMS may manage the various security related information as disclosed in the aforementioned application. These procedures may be incorporated in the content processing module 680, which in turn may reply on procedures found in the authentication 699b and authorization 699c modules. For example, when transmitting a package, in some embodiments, the decryption key maybe provided with the package. In such instances, the CCMS may store the associated decryption key with the package in the content management module.

The content management module 660 also incorporates a user interface 662 for allowing the system administrator to set rules, review and edit data, etc. This module 660 is divided into two main groups—processing metadata and content. Each maintains copies of the meta data and content, by maintaining a repository 664, 663 which accesses a corresponding manager 665,668 which in turn accesses a corresponding content store 667, 669. This module stores the received packages, generates the normalized and local assets, maintains copies of the various versions and associates them so that they can be retrieved and identified accordingly.

The site management module 670 also incorporates a user interface which is segregated into processing rules 672 and site metadata user interface 673 portions. This allows the system administrator to query, review, and edit the various data, including specific package data, at a given site. This data is stored in an associated data store 677. This allows the CCMS to have visibility and/or update data as required with a destination site.

The rules processing module 690 also comprises a user interface 693 that provides a graphical interface to users, allowing rules to be created, edited, tested, and executed. A rules processing engine 695 performs this processing, and access the data store 698 storing site or system wide processing rules.

Finally, the content processing module 680 also incorporates a user interface 682 which allows the system administrator to establish, review, and edit how the aforementioned processing occurs. A workflow scheduling module 684 coordinates the use of various external resources 686 and ensures that the steps occur in proper order. For example, an imported package may be exported only after 1) the metadata is processed for the appropriate destination site, and 2) the content is a) transcoded and b) ads are properly inserted into the video content. It may not be important as to whether function #1 or #2 is completed first, but only that both are completed prior to exporting the package. In completing the second function, it may be necessary to perform sub-function a) first (e.g., transcode the video content to the appropriate format), and then perform sub-function b) next. Performing sub-function a) requires that the transcoder (one type of external resource) be operational and available (not currently processing another file). If so, then the video asset content can be made available to the transcoder for processing, and when completed, then the ad insertion system (another form of external resource) can be monitored for operational status and availability, and the ad insertion function be completed. In various embodiments, the data to be transcoded can be made available to the transcoder by actually sending the data to the transcoder, or the transcoder can be informed of the location of the data to be transcoded and obtain it. Once both the metadata and content processing are complete, then the package can be exported. The workflow scheduling ensures among other things that the steps are done in proper order that required resources are available to complete the package ready for export, and if the package is not exported by a required time, an exception notification is generated so that manual intervention by the system administrator can occur.

The particular arrangement of the various modules and sub-modules is illustrative of only one embodiment, and other arrangements are readily possible.

Process Flow

Figure 7:
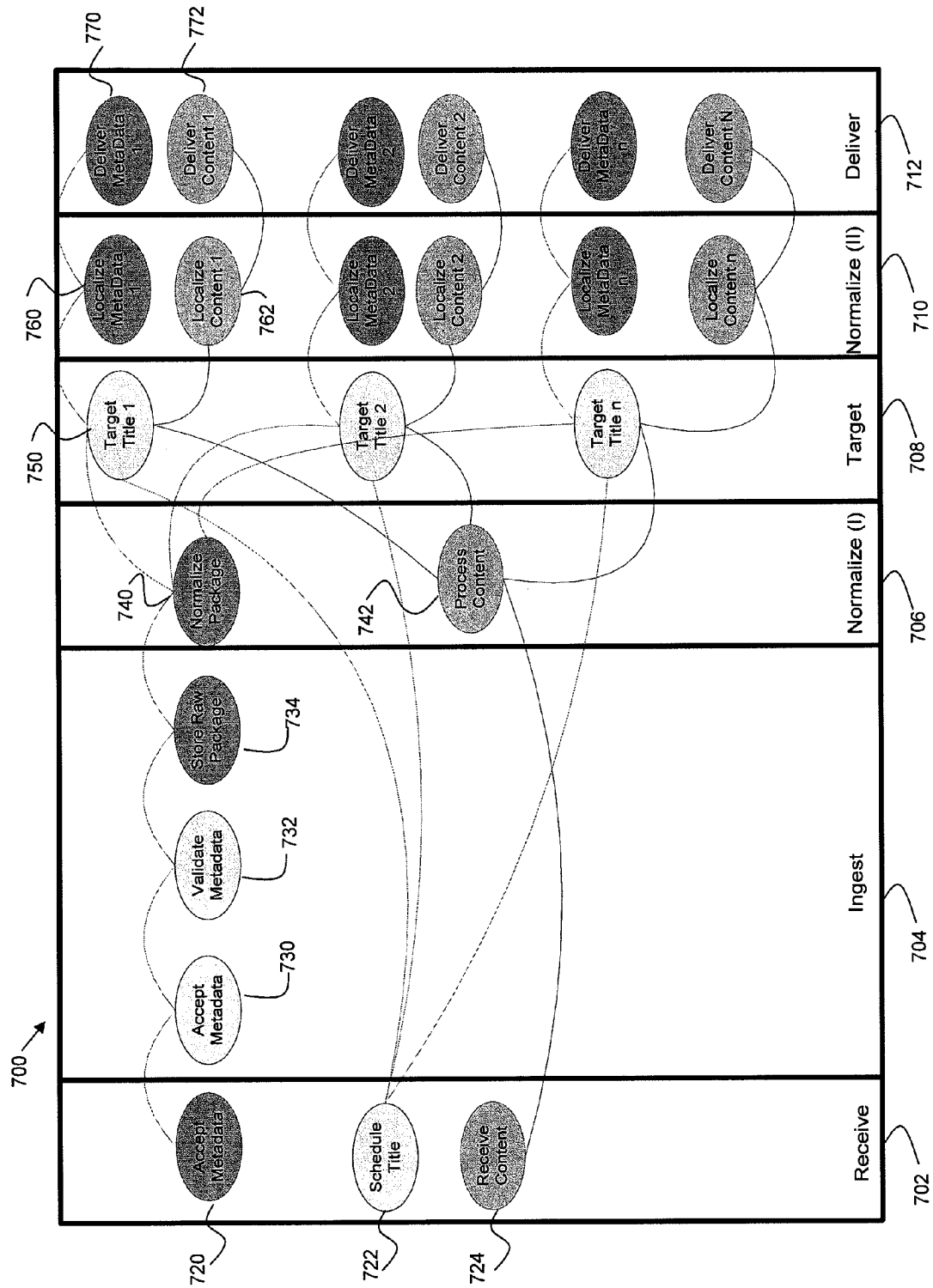
FIG. 7 illustrates one embodiment of the package processing by a CCMS.

The process flow of the CCMS can be described in terms of the processing of the imported packages. This is shown in FIG. 7, which illustrates several stages of processing for imported data. These stages are: Receive 702, Ingest 704, Normalize (I) 706, Target 708, Normalize (II) 710, and Deliver 712. These stages are illustrative, and variations are possible on the sequence of steps. Further, the order of processing meta-data in an asset with respect to the content of the same asset can be varied, as will be seen below.

In the Receive stage 702, the package comprising an asset comprising content 724 and metadata 720 is received. Although not mandatory, in many instances the program originator may also provide schedule information based on the title 722. This may encompass both information about packages which are scheduled to be received by the CCMS, when they should be received, where they are to be distributed, when they should be distributed, etc. This is particularly applicable if the scheduled packages represent regularly scheduled content that is provided by a CSP, as opposed to content which is provided on an on-demand basis. The CSP typically receives hundreds of hours of schedule programming over hundreds of channels, and information is typically provided as to when a package is to be shown. The CCMS uses this information for a variety of purposes including informing personnel when packages are to be received, allocating space for anticipated packages, when packages should be distributed, etc.

In the Ingest stage 704, the CCMS processes the meta-data by first accepting the metadata 730 and then ensuring that the received meta-data is complete and correct in the validating step 732 according to the format expected. The meta-data can then be stored in step 734. The version that is stored is based on the originally received meta-data, and there is not generated any national or local format version.

In the Normalize (I) stage 706, the CCMS processes the meta-data in step 740 to conform to the national formatting rules set forth. This includes providing default values to metadata fields which may not have been indicated or altering fields which are provided to confirm to the national version. At this point, the national version of the meta-data is typically not dependent on any one particular destination. The CCMS is also processing the content 742 to conform to system wide requirements (such as transcoding the content into a desired format). At this stage, after the content and metadata are processed, the normalized package exists on the CCMS system, and at appropriate times, the various local instances (e.g., minor versions) of the meta-data and content can be created. This may be concurrent with generating the national version, or later in time, prior to exporting the package.

At the Target stage 708, the CCMS uses the nationally conformed package to create the appropriate target values. In some embodiments, this process may be initiated based on the schedule information received from the program originator. In step 750, this is shown as occurring for a title for a particular target destination (Target Title 1). This requires that destinations be established by the system administrator and associated rules are in place. The process of conforming the package may be repeated a number of times, typically once for each destination as appropriate. Thus, if a local price is to be indicated in the title metadata that is unique to a location, it is at this time that it would be inserted. Other fields in the assets' metadata may be altered as appropriate for the destination site, as is the asset's content. For example, the video content may be altered by inserting advertising. If the value is not changed by a rule when creating the localized version, typically the value present in the national version is used (e.g., for metadata or content).

The original version of the package, including the title metadata, typically has a particular major version identifier indicated in the various assets. For example, the title metadata has a major version number, which is typically determined by the package originator. Once the national version is created, it will typically have the same major version identifier number, but a different minor version identifier number. A localized version will typically change the minor version identifier number again. Thus, it is possible by checking the major version number for various instances to ensure that they relate to the same video program.

It may be possible to reuse parts of a package, so that duplicating the same processing is not necessary. For example, once video content is transcoded for one destination, that same content may be used in a package for another destination. In order to illustrate the processing steps, the processing to generate a package for only one target destination is discussed below.

In the Normalize (II) stage 710, the rules for each location are retrieved and used to create the localized (minor) version of the meta-data in step 760 and the appropriate content version for the location. Recall that each location may require certain video content processing, including watermarking, transcoding, encrypting, etc. that is different from the national version, and to the extent that this is required, the CCMS performs this at this step. In certain embodiments, the LCMS may perform some of this function, so that the CCMS will perform only some of the content processing. The CCMS may have previously created and stored a local version that is the same, and if so, then it can be retrieved from storage, as opposed to recreating the content.

Finally, in the Delivery stage 712, the CCMS transfers the package comprising the meta-data and the content in steps 770 and 772 respectively to the destination. The delivery typically occurs shortly after the normalization, and in various embodiments, the CCMS may store a local version in its local store. In some instances, the same package may be delivered to multiple destinations. As previously described, the CCMS may provide a package comprising only title metadata or some other asset to the destination. This is often the case if the meta-data updates existing meta-data, and the CSP already has the content. In such instances, re-transmitting content that already is stored at the destination is usually to be avoided.

Package States

Figure 8:
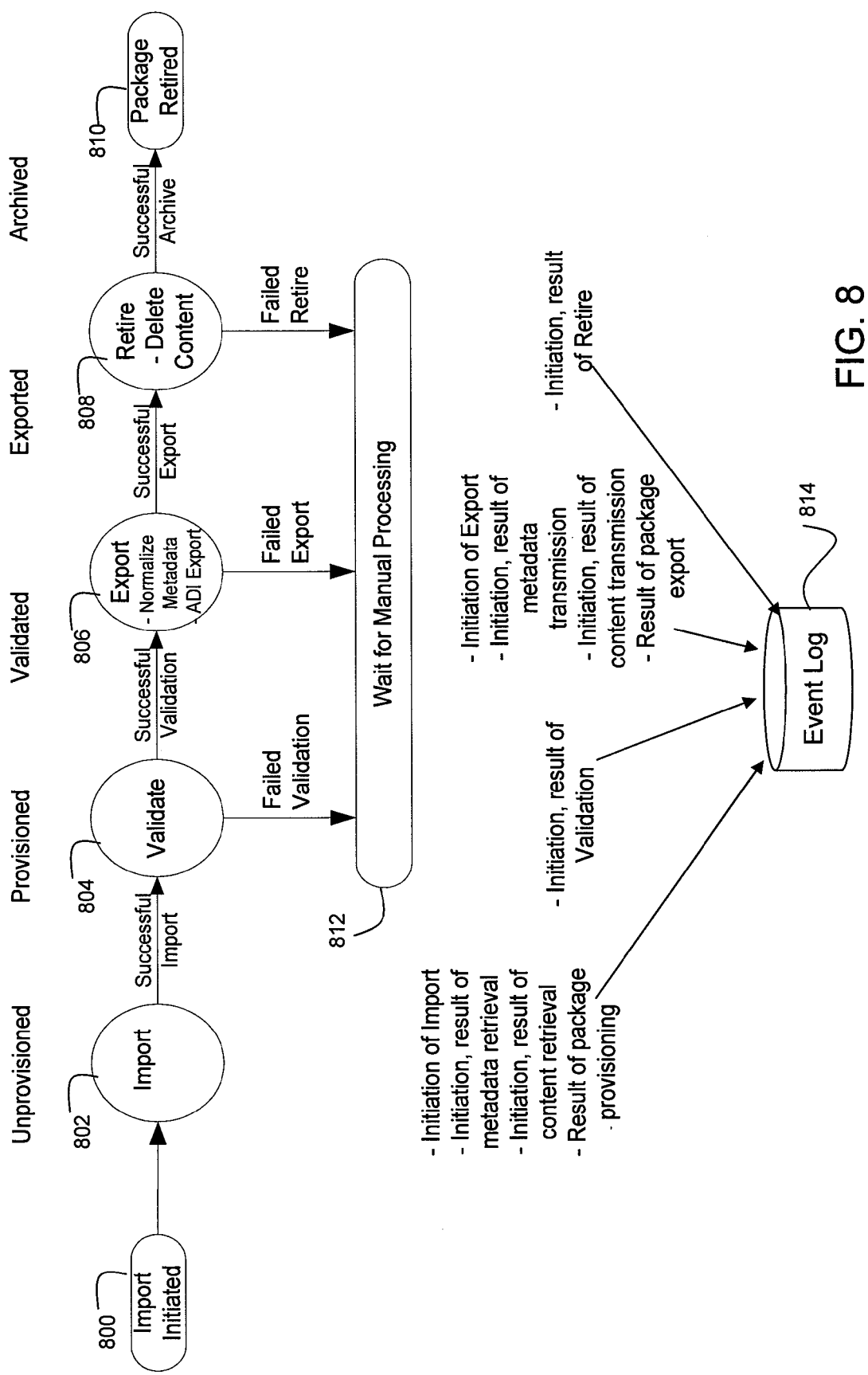
FIG. 8 illustrates one embodiment of the package states.

The package can be thought of as having a life cycle of various states and as it passes through various processing stages. One embodiment of the package's life cycle is shown in FIG. 8. wherein the circles 802, 804, 806, and 808 represent processing between package states. Throughout the life cycle of the package, the CCMS is identified by a unique identifier. In FIG. 8, the importation of the package is initiated by the program originator in step 800. The package is in the "scheduled" state, and transmitted to the CCMS in the import processing stage 802, where it is received by the CCMS and after received, the package is in the "imported" state. After imported, the package is processed in the validation processing stage 804. If the validation processing is unsuccessful, an alert is issued and the CCMS awaits input from the system administrator at step 812. If validation is successful, the package enters the "validated" state. Subsequently, the package is then normalized and exported in the Export processing stage 806. In other embodiments, the package may be temporarily in a "normalized" state before being exported, but typically exporting occurs shortly after the package is normalized. Again, if normalization is unsuccessful, the process at step 812 is entered. Presuming the package was successfully exported, the package is in the "exported" state. It is possible that the system will place the package in an "expired" state after a time period, which occurs by the passage of time. This causes processing involving the deletion of the package in the "retire" processing state 808. The result of this is that the package is "deleted." In this state, the package is deleted or copied into archive storage, and the lifecycle of the package is complete. It is possible to reactivate the package by retrieving the package from long-term memory, which can place the package back into the imported state or the validated state. Other embodiments may add or delete from the above states and processing stages. Obviously, if deleted, then the package cannot be reactivated, but would have to be imported again.

At each state of the package, the CCMS logs various events as disclosed in FIG. 8 associated with the package. Thus, the CCMS maintains various event-related data in association with the package. This includes: when the package was first imported, results of validation, results of processing the metadata and content, when and where the package was exported, and when it was retired.

Rules

Users of the CCMS can create rules which define how the CCMS is to process imported packages. In order to define a rule to manage titles across various systems, each title (e.g., the set of packages that are associated with a common title) will have associated with it, 1) an overall view of the title, 2) various version and instance information of packages associated with the title, including meta-data instances (e.g., local, national) and content versions, 3) status information for each package, and 4) planning information. This information provides a system administrator with a global perspective regarding a title (overview of a title) including what is expected to be received (planning information), when it was received (status information), and what local or national versions were created (instance information).

In order for a user to define how packages associated with a title are to be processed and exported, the system will maintain data elements directed to three main groupings: 1) title versions and instances, 2) title groupings, and 3) site groupings.

1) Title versions and Instances. This set of data groupings represents each title maintained by the CCMS and so a user can identify different versions of the title, and where that version is used. The CCMS stores multiple versions and instances of all titles, including:

Scheduled Version—this is the version of information about the title that is used in scheduling content in the CCMS before the corresponding packages are actually received from the program originator;

Raw Version—this is the title metadata received from the provider. The version is reflected by the major version number and is only assigned by the provider;

National Instance Version—This is the version of the title metadata after application of national rules. This version is reflected by the minor version number; and Localized Instance Version—This is a localized instance of a specific version (which is identified by the major and minor number) of metadata. There are two options in this case, including one instance for each individual variation of the national version, with no duplicates. For this approach, each site (head end) will be assigned a specific instance. Alternatively, a specific instance for each of the sites, with numberings for updates is provided.

Title Groups—these are groupings of titles to allow the user to view and manage titles according to useful groupings. The CCMS shall have the ability to group sites in a number of ways for use in applying rules and distributing content, including:

All—every one of the sites across the enterprise.

Individual—each of the specific sites may be addressed, such as by city or other name.

Defined Groups—Groups of named sites defined in a list. For example, by a name of an area ("Colorado Group"), MSA, or other identifier.

By Characteristic—Defined by the characteristics in the site definition, such as sites using particular vendor's equipment, capabilities, network topology, etc. For example, all sites using Brand X video headend systems.

By Status—Defined by the status of the site. For example, systems where the storage content is filled to a certain capacity.

By Content—Defined by sites determined by current content. For example, sites which receive certain content from a specified programming source of which store a particular title.

Site Groups—these are grouping of sites (head ends, distribution systems) to allow a user to manage the destinations for titles being distributed. The CCMS can group sites in a number of ways for use in applying rules and distributing content, including All—every one of the sites across the enterprise.

Individual—each of the specific sites may be addressed, such as by city or other name.

Defined Groups—Groups of named sites defined in a list. For example, the "Colorado Group" may be defined as the Denver Head End, Littleton Head End, and Boulder Head End.

By Characteristic—Defined by the characteristics in the site definition, such as sites using "Brand X" equipment.

By Status—Defined by the status of the site, such as percentage of storage capacity available.

By Content—Defined by sites determined by current content, such as site receiving content from a programming source or storing a particular title.

With these data elements, various rules can be defined. These including the following:

(a) Distribution Rules. Distribution rules are used to determine the time and actions to be taken with distributing content to sites. The general form of the rule is:

Distribute <TitleGroup> to <SiteGroup> at: [<DateAndTime> or <UponEvent>]

Examples include:

Distribute: "Ironman Version: 1.2" to "AllHeadEnds" at: 10/4/2008 12:00:00

Distribute: "Updated Starz Titles" to "RingHeadEnds" at: immediately.

Distribute: "All Titles" to: "Dearborn Head end" at: 10/3/2008 11:59:01

(b) Site Management Rules. Site Management Rules are used to maintain the distribution of titles to sites based upon individual needs of the sites. The general form of the rule is:

If <Site> Status: <status> is: <Value> then: <action>

Examples include:

If "DearbornHeadEnd" status: FreeSpace is: "<10%" then: "don't accept new titles"

If "DearbornHeadEnd" status: FreeSpace is: "<30%" then: "don't accept low-value titles"

(c) Content Modification Rules. These are rules for the changing of content based upon content needs.

Example scenarios include:

content that comes in as WMP should always be converted to MPEG-2; and content that is targeted to MPEG-4 Capable HEs should be converted to MPEG-4 for those head ends, and MPEG-2 for the other Head Ends.

(d) Metadata Modification Rules. The Metadata modification rules are used to change values for metadata based upon various criteria. These correspond to current AMS rules. The basic form of these rules is:

If <condition> setmetadataField: <metadataField> toValue: <value>

Examples include:

If {title provider=Starz} setMetadataField: "Suggested Price" toValue: "3.99"

If {title=SuperherosGroup} setMetadataField: "Category" to Value: "Superhero Promotion"

If {(format="HD") and (Provide=Starz)} setMetadataField: "Price" to Value: "7.99"

(e) Instance Creation Rules. Each title in the CMS must be managed from initial reception, modification, distribution and finally deletion from the systems. The title can be updated in major version by the provider, in the minor version as determined by the national rules, and in the local instance as determined by the local rules.

Example scenarios include:
1. Changes or to the title are made—these may be changes in the metadata (local or national), distribution rules, etc.
2. A new distribution in inaugurated for a given title.
   a. Destinations are selected for the title according to distribution rules, metadata and targeting.
3. National rules are applied to create a new version.
4. Local rules are applied to create instances
5. Instances are determined for distribution.
6. Instances are distributed to appropriate sites.

User Commands

In addition to creating rules, users can issue commands in real time to the CCMS that are performed on existing packages, which would accomplish similar results as the system applying a rule. Generally, for every capability that a user can specify in a rule, a similar capability (or capabilities) is provided to the user via one or more commands. However, the logic capability associated with applying a rule may not have a corresponding capability in a command. This can be explained by an illustration. Consider, for example a rule defined as follows that sets a price for incoming packages:

IF <condition> SetMetadataField: <metadataField> to Value: <value>.

A specific instance of this rule could be:

IF {title provider=HBO®} SetMetadataField: "Suggested Price" to Value: "$3.99".

However, the user could issue commands to accomplish a similar result. The user could enter a command that queries the "suggested price" field for a particular title and determine based on the result whether it originated from HBO® by reviewing the meta-data and determined whether it was set to $3.99. If it is not the appropriate value, the user could issue a command to update the field to $3.99. This would accomplish a similar result by invoking commands as would be by defining a rule applied to processing an incoming package. Note that users can also command the CCMS to apply rules to packages that already have been received.

Consequently, the user may invoke commands that have similar or analogous rule capabilities. These include: exporting a title; importing a title, creating national or local instances of meta-data; updating meta-data fields; querying for instances of meta-data Administrator Access There are various types of users that can access and manage assets using a CCMS. The "highest" level of authority is a system administrators ("SA") that can access all capabilities of the CCMS that a user can access. "Lower levels" of authority are possible for users. Each users typically provides identification and authentication information in order to log onto the system, and permission levels are associated with each user's account. The SA typically accesses the CCMS via a secured Internet connection, although other communication arrangements are possible. The authority of users is illustrated in table 1 shown in FIG. X.

In FIG. 9, capabilities indicated are explained as follows:
a. User Accounts—refers to the capability of establishing lower level user groups;
b. System Configuration—refers to the capability of configuring various system components in the CCMS;
c. CCMS Database—refers to querying or editing portions of the various databases in the CCMS;
d. Contact Info—refers to telephone, email, or other contact information for appropriate personnel associated with a system;
e. Metadata—refers to the capability to edit, review, or otherwise process meta-data;
f. Content—refers to the capability to edit, review or otherwise process asset content;
g. Reporting Options—refers to the capability to create and run various reports on system aspects; and
h. Headends—refers to which headends the user can access for operation of the CCMS.

Applications of Commands

Viewing and Editing Metadata. A common application of the CCMS is for viewing and editing meta-data associated with packages. The management of metadata values can be based upon a particular title, groups of titles, site and/or group of sites.

Processing of metadata can occur prospectively by creating a rule that modifies future imported packages, or as a command that modifies metadata of presently received packages in the CCMS prior to exporting, or even modifying the metadata after the package has been distributed to a destination (which is accomplished by adding a command to transmit the updated metadata to the appropriate sites).

Metadata transformation rules are stored in CCMS and associated with the package using the schema, provider, and product associated with the package, as well as the transformation operation (e.g. normalize/downcast, preview) being performed. To view transformation rules, a CCMS User with appropriate permissions selects a transformation at the appropriate CCMS GUI; the CCMS GUI displays transformation which includes the transformation rules for the selected transformation.

Rules may be structured or organized to apply to groupings of output formats, titles, and functions. These rules may be further refined automatically to transform specific metadata fields based upon actions for the target output. For specific analysis types, the user will be allowed to use higher level rules and not be forced to work on a title by title or system by system basis.

The CMS User edits the normalization rules as desired, and the Asset Manager component updates its local data store with the modifications. Transformation rules may be applied on package edit, preview, export, or validation. The exact sequence will be determined during definition of system workflow.

Figure 10:
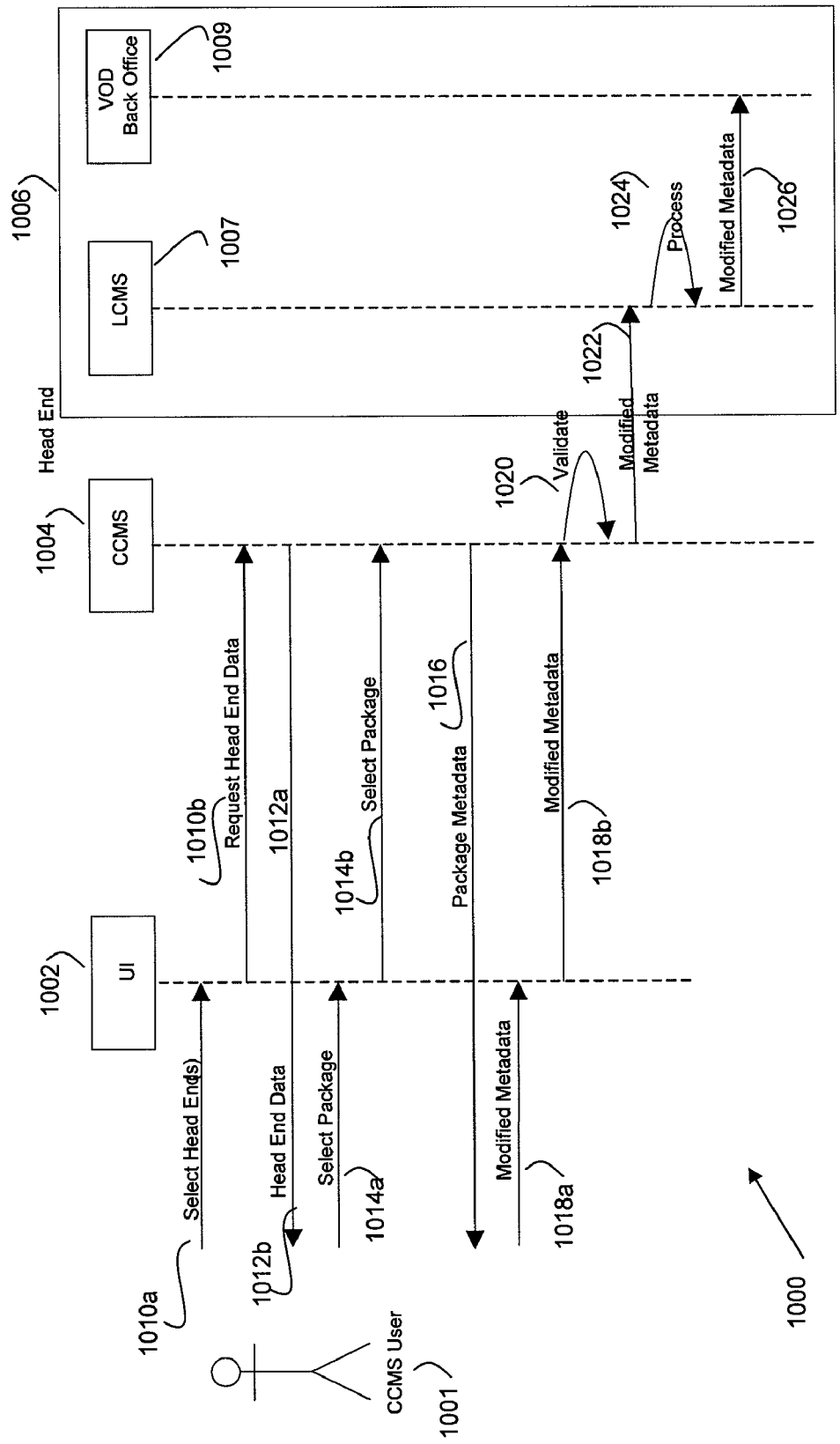
FIG. 10 illustrates one embodiment of CCMS processing flow.

In the example that follows as illustrated in FIG. 10, a system user accesses the CCMS to select and edit meta-data associated with a title that already has been distributed to a site. In FIG. 10, the system 1000 comprises the system user 1001 interacting with a User Interface 1002 of a CCMS 1004, which has distributed a package to a cable headend 1006, comprising a LCMS 1007 and a VOD system 1009. The user 1001 first selects a headend system that is to be queried in step 1010*a*. This results in the CCMS receiving the request 1010*b* and providing potential titles associated with that site in the response 1012*a*, which is provided to the user in step 1012*b*. The user then selects a particular package in step 1014*a*, 1014*b*, which results in the particular package's meta-data 1016 returned and presented to the user. The user view and then modifies the meta-data via input at step 1018*a*, and the resulting updated data is provided to the CCMS in step 1018*b*. The CCMS validates the data in step 1020, and provides it to the proper destination LCMS in step 1022. There, the LCMS processes the update meta-data 1024 to update its appropriate systems in step 1026, which in this case, is a VOD back office system. This process may be repeated (automatically) by the CCMS if the user has updated a group of sites, or a group of titles. If the edits were on a national level or system wide level, the updated meta-data would be propagated as appropriate.

If a rule is created, the user may test the rule by applying the test on a step by step basis. The CCMS will then show results after each step of processing, including the packages and locations that would be affected by the new rule.

The CCMS also records via its log data file the appropriate events that occur during rule processing. Thus, a record of kept of the new meta-data for the title, when it was transmitted to the site, which sites received it, etc. In this manner, the system user can obtain an accurate status of the system.

The editing or updating of meta-data accommodates various business practices, including the following examples:
  a. Drop the price of all titles by $1.00;
  b. In the last 7 days of a title's window move it to a "Last Chance Category" and drop the price by $1;
  c. Change the price on all transactional VOD titles on <specific date>;
  d. Change the categories and pricing on all adult titles;
  e. 7 days prior to the end of a window, move <titles> to a special category and reduce price by $1;
  f. Set all movies received from a specified program source to $14.99;
  g. Set up a special "Paul Newman Week" with a category and special pricing;
  h. Double list titles that are in multiple category types;
  i. Effect various local price and windowing changes; and
  j. Enter the appropriate disable trick mode codes for various equipment type VOD servers.

Advanced Notification and Scheduling

The CCMS can receive schedule information of titles that are to be received from a program originator and create minimal package(s), which may or may not contain content and metadata. Either rules or explicit user interaction will set up the distribution timing and destinations for titles. This setup will be used to create workflows and alerts that ensure the proper and timely distribution of titles to the correct destination. This can also be used to inform system users of the CCMS of upcoming titles, and allow appropriate planning for resources. If the titles are not received by the indicated date, notifications or other correction action (such as allocating storage space) can be taken to ensure the packages are received as expected.

Content Distribution

A user can establish a rule or command to effect exportation of a package, along with the rules that should be applied. In the case of rules, the system user can create, edit, or preview the rules that are to be applied, and test the rules prior to application to ensure the rules are properly defined. The rules can be triggered based on time (e.g., exporting existing packages to destinations at certain times) and/or events (process and export a package whenever received).

Content can be distributed to a single site, or multiple sites associated with a service provider. Further, "partial" distribution of assets is possible. In one embodiment, this refers to transmitting a package promotion video asset, followed by transmitting the video program content itself at a later time. Other applications include distributing subsequent installments of a series (e.g., a weekly television program). The CCMS can also retire content as a result of distribution. In this case, the content itself is not being distributed, but updates to the meta-data are provided to all those sites that received the content.

Rule Establishment and Validation

A system user can create, edit, and validate rules. Basic metadata validation is provided by software modules in the CCMS that can apply metadata schemes, including using an XML Schema which is associated with the particular asset (see, e.g., the aforementioned CableLabs ADI specification).

Using schema validation, a variety of type, range, and other constraints can be enforced. Additional user-defined business rules are stored in the CCMS, and associated with the package using the schema, provider, and product associated with the package. If the user edits the validation rules, the assets can be re-validated as necessary. The validation rules are applied to packages upon import and when validation rules are modified.

Metadata transformation rules are stored in CCMS and associated with the package using the schema, provider, and product associated with the package, as well as the transformation operation being performed (e.g. normalize/downcast, preview, etc.). To view transformation rules, a CCMS User with appropriate permissions selects a transformation at the CMS GUI; the CMS GUI displays transformation which includes the transformation rules for the selected transformation.

Rules may be structured or organized to apply to groupings of output formats, titles, and functions. These rules may be further refined automatically to transform specific metadata fields based upon actions for the target output. For specific analysis types, the user will be allowed to use higher level rules and not be forced to work on a title by title or system by system basis.

The CCMS User edits the normalization rules as desired, and the CCMS updates its local data store with the modifications. Transformation rules may be applied on package edit, preview, export, or validation stages of processing. The exact sequence will be determined during definition of system workflow.

Typical Use Examples

The CCMS affords considerable flexibility in allowing fulfillment of business goals, and simplifies the management of assets. Consider an example where a service provider operates over 40 cable heads in various cites. Of particular interest are the cable headends in four of the following cities, as shown in Table 1:

TABLE 1

| Headend | State | City Size | Capacity | Storage Capacity Status |
| --- | --- | --- | --- | --- |
| HE1 - Dallas | TX | Large | High | 80% |
| HE2 - New York City | NY | Large | High | 80% |
| HE3 - Syracuse | NY | Small | Medium | 95% |
| HE4 - Binghamton | NY | Small | Low | 75% |

Further, assume that modifications are desired to the following titles, as shown in Table 2:

TABLE 2

| Title | Genre | Suggested Price | Content File Size | Importance |
| --- | --- | --- | --- | --- |
| Professional Football Game - Giants vs. Redskins | Football | $3.50 | Small | High |

TABLE 2-continued

| Title | Genre | Suggested Price | Content File Size | Importance |
|---|---|---|---|---|
| Professional Football Game - Cowboys vs. Broncos | Football | $3.50 | Small | High |
| Gone with the Wind | Movie | $4.50 | Large | Low |
| Mr. Toberts | Movie | $4.50 | Small | Low |
| Syracuse High School Football Game | Football | $6.50 | Medium | High |

Specifically, the professional football games are shown in all 40+ markets by the service provider, but in the two "Large" cities of Dallas and New York City, the professional football game prices should updated to a higher price of $5.99. However, the Syracuse High School Football Game should only be shown in Syracuse with lower price of $1.99. Further, movies with a "Large" content size (e.g. "Gone With The Wind") should only be transmitted to systems having a "High" storage capacity (e.g., that are at 80% or less capacity). Finally, the movie title of "Mr. Toberts" should be corrected to "Mr. Roberts."

It should now be appreciated that manually effecting these changes by accessing the head systems in each of the potentially 40+ cables systems to update these five instances of data could involve 200+ changes. Obviously, if the same information is sent to all the cable systems as is done in the prior art, certain cable systems would have incorrect information and system personnel at each headend would have to manually customize information as appropriate for that market. Without customizing meta-data by the CCMS, each site would be treated the same, and exception handling would be very difficult. Without being able to even verify which sites received which data, it would not even be possible to effectively correct or edit information at a given site. For example, even if the site had correct information, this may not be verified by the system operator until personnel checked each title in each headend.

However, the CCMS allows rules to be set up to process incoming packages to do this automatically or a system administrator could enter commands. Examples of possible commands include:
- a. If (Title="Professional Football Game—Giants vs. Redskins" or "Professional Football Game—Cowboys vs. Broncos") then SuggestedPrice=$5.99;
- b. If (Title="Syracuse High School Football Game") then SuggestedPrice=$1.99;
- c. Distribute (all titles where genre="movie") and (headend capacity="high") and (storage status=<80%);
- d. Change all instances on all sites where title="Mr. Toberts" to "Mr. Roberts".

The above are merely illustrative of rules that can be created and applied to existing packages, or commands which a user could invoke to perform the desired changes. The syntax and semantics of the commands are illustrative, and those skilled in the art will recognize that other formats are possible.

Those familiar with the various meta-data fields associated with a title in a package will recognize that the CCMS can effect various edits in the title, such as:
- change the prices on certain titles for certain dates at certain site locations;
- automatically alter the prices for titles at the end of promotion defined by a time window;
- automatically alter prices from a particular program provider for certain categories;
- create rules for placing titles into certain categories for a certain time with a certain price; and
- add titles to newly created category.

The above list is only illustrative, and does not represent all the capabilities that are provided by the CCMS system.

The above describes one embodiment of the invention, and other embodiments are possible and within the scope of the invention. The invention may be embodied in a system incorporating all or some of the above, methods of operating incorporating all or some of the above, as well as computer-readable program instructions adapted for performing some or all of the above functions.

That which is claimed:

1. A system for exporting a localized package to a video service provider wherein said video service provider provides a video program over a distribution facility to a subscriber of the video service provider for viewing, said system comprising:
   a first interface configured to receive a first package, said first package comprising a data structure comprising:
   a) a first title metadata, said first title metadata indicating a title of said video program, and
   b) a first video asset further comprising a first video content and a first video metadata part, wherein said first video metadata comprises a first major version value and a first minor version value;
   a processor configured to:
   a) receive the first package from the first interface,
   b) store the first package,
   c) generate a normalized package based on the first package, wherein said normalized package comprises a normalized title metadata and a normalized video asset, said normalized title metadata being different from said first title metadata and said normalized video asset is determined independently from a particular video service provider destination;
   d) ascertain a destination video service provider to receive a localized package wherein said localized package is based on said normalized package,
   e) retrieve video service provider destination specific configuration data,
   f) generate said localized package using said normalized package and said video service provider destination specific configuration data, wherein said localized package comprises a second data structure comprising:
   a) second title metadata, said title metadata indicating the title of the video program, said second title metadata being different from said normalized title metadata, and
   b) a second video asset further comprising a second video content and a second video metadata, wherein said second video content is based on the first video content, and the second video metadata comprises the first major version value and a second minor version value;
   a data storage configured to storing said first package, said normalized package, and said localized package, and said video service provider destination specific configuration data; and
   a second interface configured to receive said localized package from said processor, and transmit said localized package to said video service provider.

2. The system of claim 1 wherein the processor is configured to generate the localized package such that the second minor version value in the localized package is different from the first minor version value in the first package.

3. The system of claim 2 wherein said data storage is configured to store destination independent configuration data used by the processor in generating said normalized package.

4. The system of claim 2 further comprising:
a transcoder, said transcoder configured to receive said first video content from said data storage in a first encoding format and generate a digital video file in a second encoding format, wherein said localized package comprises said digital video file in a second encoding format.

5. The system of claim 4 wherein said localized package comprises second video content comprising advertisements.

6. The system of claim 2 wherein the processor is configured to use said video service provider destination specific configuration data to determine a price of the video program in second title metadata, wherein the second price is different than a price of the video program in the first package.

7. The system of claim 6 wherein the video service provider destination specific configuration data identifies a geographical serving area of the video service provider.

8. The system of claim 4 wherein said second video metadata of said localized package reflects said second encoding format.

9. The system of claim 8 wherein said second encoding format is indicated in said video service provider destination specific configuration data.

10. A method of exporting a localized package to a video service provider comprising the steps of:
receiving a first package from a communication facility originating from a video program distributor at a first interface of a processing system, said first package comprising a data structure comprising:
 a) a first title metadata, said first title metadata indicating a title of a video program, and
 b) a first video asset further comprising a video content and a video metadata, wherein said video metadata comprises a first major version value and a first minor version value;
storing said first package in a data storage system of the processing system by a processor;
generating a normalized package based on the first package by said processor, said normalized package generated independent of said video service provider, wherein said normalized package comprises a normalized title metadata and a normalized video asset, said video asset comprising a normalized video content and a normalized video metadata;
ascertaining a video service provider to receive a localized package by said processor, wherein said localized package is based on said normalized package;
said processor retrieving video service provider destination specific configuration data from the data storage system;
generating said localized package using i) said normalized package and ii) said video service provider destination specific configuration data, wherein said localized package comprises a second data structure comprising
 a) a second title metadata, said second title metadata indicating the title of the video program, and
 b) a second video asset further comprising a second video content and a second video metadata, wherein said second video content is based on the first video content, and the second video metadata comprises a second version value, said second version value comprising the first major version value and a second minor version value;
storing said localized package in said data storage system; and
said processor transmitting said localized package over a second interface to said video service provider.

11. The method of claim 10 wherein said second video content is a MPEG based encoded digital video file generated by transforming said first video content, wherein said video file represents a series of digital image data of physical objects.

12. The method of claim 11 wherein said second video content is generated by a transcoder receiving said first video content in a first encoding format and generating said second video content in a second encoding format.

13. The method of claim 12 wherein said processor sets a value in the second video metadata to indicate said second encoding format.

14. The method of claim 13 wherein said second minor version value of said localized package is different from said first minor version value of said first package.

15. The method of claim 10 further comprising the steps of:
retrieving a second video service provider destination specific configuration data from said data storage system;
generating a second localized package using said normalized package and said second video service provider destination specific configuration data, wherein said second localized package comprises a second data structure comprising
 a) a third title metadata, said title metadata indicating the title of the video program, and
 b) a third video asset further comprising a third video content and a third video metadata, wherein said third video content is based on the first video content, and the third video metadata comprises a third version value, said third version value comprising the first major version and a third minor version value;
storing said second localized package in said data storage system; and said processor transmitting said localized package over a second interface to said second video service provider.

16. The method of claim 10 further comprising the steps of:
receiving at said processing system a distribution schedule indicating a date by which said package should be exported by said processing system; and
said processing system transmitting said localized package over a second interface to said video service provider prior to said date.

17. The method of claim 10 further comprising the steps of:
receiving at said processing system a date by which said localized package should be deleted from said data storage system; and
said processing system deleting said localized package from said data storage system based on said date.

18. A non-transitory computer-readable medium containing code executable by a processor for providing a package to a video service provider comprising computer-readable program instructions adapted for:
receiving a first package from a communication facility originating from a video program distributor at a first interface of a processing system, said first package comprising a data structure comprising:
 a) a first title metadata, said first title metadata indicating a title of a video program, and
 b) a first video asset further comprising a video content and a video metadata, wherein said video metatdata comprises a first major version value and a first minor version value;

storing said first package in a data storage system of the processing system by a processor;

generating a normalized package based on the first package, wherein said normalized package is generated independent of the video service provider, wherein said normalized package comprises a normalized title metadata and a normalized video asset, said normalized video asset comprising a normalized video content and a normalized video metadata;

ascertaining the video service provider to receive a localized package by said processor, wherein said localized package is based on said normalized package;

retrieving video service provider destination specific configuration data from the data storage system;

generating said localized package using i) said normalized package and ii) said video service provider destination specific configuration data, wherein said localized packagecomprises a second data structure comprising:
  a) a second title metadata, said second title metadata indicating the title of the video program, and
  b) a second video asset further comprising a second video content and a second video metadata, wherein said second video content is based on the first video content, and the second video metadata comprises a second version value, wherein said second version value comprises the first major version value and a second minor version value;

storing said localized package in said data storage system; and transmitting said localized package over a second interface to said video service provider.

19. The non-transitory computer-readable medium of claim 18 further comprising computer-readable program instructions adapted for:

retrieving a second video service provider destination specific configuration data from said data storage system;

generating a second localized package using said normalized package and said second video service provider destination specific configuration data, wherein said second localized package comprises a second data structure comprising
  a) a third title metadata, said title metadata indicating the title of the video program, and
  b) a third video asset further comprising a third video content and a third video metadata, wherein said third video content is based on the first video content, and the third video metadata comprises a third version value, said third version value comprising the first major version value and a third minor version value;

storing said second localized package in said data storage system; and transmitting said localized package over a second interface to said second video service provider.

20. The non-transitory computer readable medium of claim 18 further comprising computer-readable program instructions adapted for:

providing a user interface to a user to enter said first and second video service provider destination specific configuration data; and storing a first and second video service provider destination specific configuration data in said data storage system.

21. The non-transitory computer readable medium of claim 20 further comprising computer-readable program instructions adapted for:

providing a user interface to said user to enter price data for inclusion in said localized package for said video service provider destination;

storing said price data in said data storage system as part of said video service provider destination specific configuration data; and generating said localized package comprising said second title metadata wherein said second title metadata comprises said price data.

* * * * *

UNITED STATES PATENT AND TRADEMARK OFFICE
CERTIFICATE OF CORRECTION

| | | |
|---|---|---|
| PATENT NO. | : 8,136,142 B2 | Page 1 of 1 |
| APPLICATION NO. | : 12/496738 | |
| DATED | : March 13, 2012 | |
| INVENTOR(S) | : Alexander et al. | |

It is certified that error appears in the above-identified patent and that said Letters Patent is hereby corrected as shown below:

ON THE TITLE PAGE:
Item (57), under "ABSTRACT", in Column 2, Line 8, delete "and the" and insert -- and --, therefor.

IN THE SPECIFICATIONS:
In Column 22, Line 41, delete "FIG. 8." and insert -- FIG. 8, --, therefor.

In Column 25, Line 58, delete "users" and insert -- user's --, therefor.

IN THE CLAIMS:
In Column 32, Line 65, in Claim 18, delete "metatdata" and insert -- metadata --, therefor.

In Column 33, Lines 17-18, in Claim 18, delete "packagecomprises" and insert -- package comprises --, therefor.

Signed and Sealed this
Nineteenth Day of June, 2012

David J. Kappos
*Director of the United States Patent and Trademark Office*